(12) United States Patent
Sanada et al.

(10) Patent No.: US 10,587,200 B2
(45) Date of Patent: Mar. 10, 2020

(54) BIDIRECTIONAL INSULATED DC/DC CONVERTER AND SMART NETWORK

(71) Applicants: TOSHIBA MITSUBISHI-ELECTRIC INDUSTRIAL SYSTEMS CORPORATION, Chuo-ku (JP); The Ritsumeikan Trust, Kyoto-shi (JP)

(72) Inventors: Kazunori Sanada, Chuo-ku (JP); Toshihide Nakano, Chuo-ku (JP); Kazuki Nishimura, Chuo-ku (JP); Takao Kawabata, Otsu (JP); Yoshitaka Kawabata, Kusatsu (JP)

(73) Assignees: TOSHIBA MITSUBISHI-ELECTRIC INDUSTRIAL SYSTEMS CORPORATION, Chuo-ku (JP); The Ritsumeikan Trust, Kyoto-shi (JP)

( * ) Notice: Subject to any disclaimer, the term of this patent is extended or adjusted under 35 U.S.C. 154(b) by 0 days.

(21) Appl. No.: 16/303,230

(22) PCT Filed: Apr. 13, 2017

(86) PCT No.: PCT/JP2017/015061
§ 371 (c)(1),
(2) Date: Nov. 20, 2018

(87) PCT Pub. No.: WO2017/208639
PCT Pub. Date: Dec. 7, 2017

(65) Prior Publication Data
US 2019/0207526 A1      Jul. 4, 2019

(30) Foreign Application Priority Data

May 31, 2016    (JP) ................................. 2016-108804

(51) Int. Cl.
*H02M 3/335*    (2006.01)
*H02J 7/00*      (2006.01)
(Continued)

(52) U.S. Cl.
CPC ......... *H02M 3/33584* (2013.01); *H02J 7/007* (2013.01); *H02M 1/12* (2013.01); *H02M 2001/0009* (2013.01)

(58) Field of Classification Search
CPC .......... H02M 3/22; H02M 3/24; H02M 3/325; H02M 3/335; H02M 3/33576;
(Continued)

(56) References Cited

U.S. PATENT DOCUMENTS 7,839,023 B2 * 11/2010 Jacobson ................ H02M 1/42
                                                         307/77
9,263,948 B1 * 2/2016 Vovos ................... H02M 3/158
(Continued)

FOREIGN PATENT DOCUMENTS

| JP | 2014-508495 A   | 4/2014 |
| JP | 2016-39663 A    | 3/2016 |
| WO | WO 2015/056503 A1 | 4/2015 |

OTHER PUBLICATIONS

International Search Report dated Jul. 11, 2017 in PCT/JP2017/015061 filed on Apr. 13, 2017.
(Continued)

*Primary Examiner* — Adolf D Berhane
(74) *Attorney, Agent, or Firm* — Oblon, McClelland, Maier & Neustadt, L.L.P.

(57) ABSTRACT

A bidirectional insulated DC/DC converter includes a first single-phase 3-level inverter, a second single-phase 3-level inverter, and an insulated transformer. The first single-phase 3-level inverter generates a first AC voltage between output terminals based on a first DC voltage received from a first DC circuit. The second single-phase 3-level inverter generates a second AC voltage between output terminals based on a second DC voltage received from a second DC circuit. The insulated transformer includes a primary winding that
(Continued)

receives the first AC voltage from the output terminals and a secondary winding that receives the second AC voltage from the output terminals.

12 Claims, 14 Drawing Sheets

(51) Int. Cl.
  *H02M 1/12* (2006.01)
  *H02M 1/00* (2006.01)
(58) Field of Classification Search
  CPC .............. H02M 3/33584; H02M 1/12; H02M 2001/0009; H02J 7/007
  See application file for complete search history.

(56) References Cited

U.S. PATENT DOCUMENTS

| | | | | |
|---|---|---|---|---|
| 9,667,157 | B1* | 5/2017 | Dong | G01R 19/175 |
| 10,340,809 | B2* | 7/2019 | Boysen | H02M 3/33584 |
| 2011/0149611 | A1* | 6/2011 | Moussaoui | H02M 3/33584 |
| | | | | 363/21.04 |
| 2014/0003095 | A1 | 1/2014 | Thomas et al. | |
| 2016/0233778 | A1 | 8/2016 | Sanada et al. | |
| 2019/0157986 | A1* | 5/2019 | Ginart | H02M 3/158 |
| 2019/0214811 | A1* | 7/2019 | Nishimura | H02H 7/1216 |
| 2019/0260308 | A1* | 8/2019 | Nishimura | H02J 9/062 |

OTHER PUBLICATIONS

Kawabata, Y. et al., "New control method of bidirectional isolated DC/DC converter—Control system which can obtain output voltage much higher than winding ratio of transformer-", JIPE-39-18, Journal of the Japan Institute of Power Electronics, vol. 39, Mar. 2014, pp. 121-127 (with English Abstract).

Akinu, N. et al., "An Investigation of Power Control Characteristics of a Primary-/ Secondary-Side Dual Phase Shift PWM Controlled Series-Resonant Bidirectional DC-DC Converter", JIPE 39-16, Journal of the Japan Institute of Power Electronics, vol. 39, Mar. 2014 pp. 105-111 (with English Abstract).

Office Action dated Jan. 7. 2020, in Japanese Patent Application No. 2018-520699, with English-language Translation.

* cited by examiner

BIDIRECTIONAL INSULATED DC/DC CONVERTER AND SMART NETWORK

TECHNICAL FIELD

The present invention relates to a bidirectional insulated DC/DC converter and a smart network including the same.

BACKGROUND ART

In a smart network including a plurality of DC power systems, it is necessary to supply DC power from a DC power system having excessive DC power to a DC power system having insufficient DC power. Also, in the DC power system, sometimes the DC power is excessive or insufficient, so that DC voltage fluctuates.

A configuration in which a bidirectional insulated DC/DC converter is provided between two DC power systems has been proposed in order to stably supply the DC power without being affected by the fluctuation in DC voltage. As the bidirectional insulated DC/DC converter, there is one including two inverters coupled by an insulated transformer (for example, see NPLs 1 and 2).

CITATION LIST

Non-Patent Literature

NPL 1: Yoshitaka Kawabata, et al., "New control method of bidirectional isolated DC/DC converter—Control system which can obtain output voltage much higher than winding ratio of transformer—" JIPE-39-18, Journal of the Japan Institute of Power Electronics Vol. 39 (2014.3)

NPL 2: Nakabayashi Akinu, et al., "An Investigation of Power Control Characteristics of a Primary-/Secondary-Side Dual Phase Shift PWM Controlled Series-Resonant Bidirectional DC-DC Converter", JIPE 39-16, Journal of the Japan Institute of Power Electronics Vol. 39 (2014.3)

SUMMARY OF INVENTION

Technical Problems

In the bidirectional insulated DC/DC converter described in NPLs 1 and 2, each of the two inverters is constructed with a 2-level inverter. Because the 2-level inverter has a harmonic component in output AC voltage, distortion of the output AC current increases due to the harmonic component, which results in degradation of conversion efficiency.

As a countermeasure for suppressing the harmonic component of the output AC current, NPL 2 proposes a technique of connecting a series resonance circuit including a reactor and a capacitor in series to a primary winding of the insulated transformer.

According to the above technique, a reactor that originally needs only about 20% to about 30% of a rated value is increased to about 120% to about 130% of the rated value, and an effective reactor value falls into about 20% to about 30% of the rated value using a capacitor that resonates with the reactor value of 100% of the rated value.

However, according to the technique described in NPL 2, although the harmonic component can be reduced by increasing the reactor, the device is enlarged. Additionally, a loss is generated in the series resonance circuit, so that large improvement of the conversion efficiency is hardly expected.

The present invention has been made to solve to such problems, and an object of the present invention is to provide a bidirectional insulated DC/DC converter capable of preventing the harmonic component with a compact configuration.

Solution to Problems

According to one aspect of the present invention, a bidirectional insulated DC/DC converter exchanges DC power between first and second DC circuits. The bidirectional insulated DC/DC converter includes a first single-phase 3-level inverter, a second single-phase 3-level inverter, and an insulated transformer. The first single-phase 3-level inverter generates a first AC voltage between a first output terminal and a second output terminal based on a first DC voltage received from the first DC circuit. The second single-phase 3-level inverter generates a second AC voltage between a third output terminal and a fourth output terminal based on a second DC voltage received from the second DC circuit. The insulated transformer includes a primary winding that receives the first AC voltage from the first and second output terminals and a secondary winding that receives the second AC voltage from the third and fourth output terminals.

Advantageous Effect of Invention

According to the present invention, a bidirectional insulated DC/DC converter capable of preventing a harmonic component can be constructed with a compact configuration.

DESCRIPTION OF EMBODIMENTS

Figure 1:
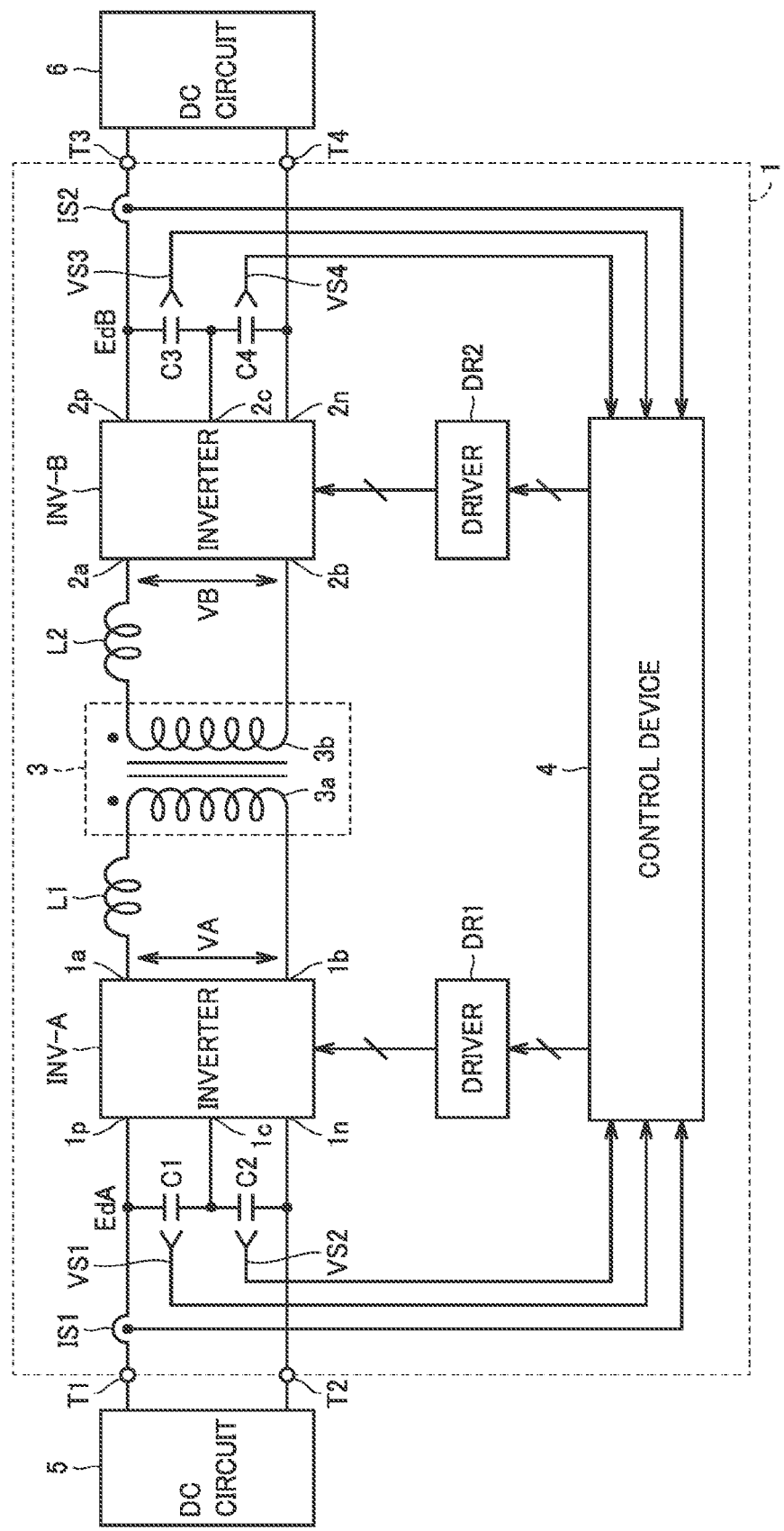
FIG. 1 is an overall configuration diagram illustrating a bidirectional insulated DC/DC converter according to a first embodiment of the present invention.

Hereinafter, embodiments of the present invention will be described in detail with reference to the drawings. The same or corresponding component is denoted by the same reference numeral, and the overlapping description will be omitted.

[First Embodiment]
(Configuration of Bidirectional Insulating DC/DC Converter)

FIG. 1 is an overall configuration diagram illustrating a bidirectional insulated DC/DC converter according to a first embodiment of the present invention.

Referring to FIG. 1, a bidirectional insulated DC/DC converter 1 of the first embodiment includes positive voltage terminals T1, T3, negative voltage terminals T2, T4, current detectors IS1, IS2, voltage detectors VS1 to VS4, capacitors C1 to C4, single-phase 3-level inverters INV-A, INV-B, reactors L1, L2, an insulated transformer 3, a control device 4, and drivers DR1, DR2.

A DC circuit 5 is connected to terminals T1, T2, and a DC circuit 6 is connected to terminals T3, T4. For example, DC circuit 5 includes a DC power supply that generates DC power and a load driven by the DC power. DC circuit 6 includes a power storage device that stores the DC power. Examples of the DC power supply include a solar power generator and a wind power generator. Examples of the power storage device include a LiPo (lithium polymer) battery, and an electric double layer capacitor.

Bidirectional insulated DC/DC converter 1 supplies the excessive DC power to DC circuit 6 when DC circuit 5 has the excessive DC power, and supplies the DC power of DC circuit 6 to DC circuit 5 when DC circuit 5 has the insufficient DC power. At that time, bidirectional insulated DC/DC converter 1 transmits and receives the DC power regardless of a level difference of a DC voltage EdA of DC circuit 5 and a DC voltage EdB of DC circuit 6.

Single-phase 3-level inverter INV-A (first single-phase 3-level inverter) includes three DC terminals (a positive voltage terminal $1p$, a neutral voltage terminal $1c$, a negative voltage terminal $1n$) and two AC terminals $1a$, $1b$. Positive voltage terminal $1p$ of single-phase 3-level inverter INV-A is connected to the positive voltage terminal T1 through current detector IS1, and negative voltage terminal $1n$ of single-phase 3-level inverter INV-A is connected to negative voltage terminal T2.

Capacitors C1, C2 are connected in series between positive voltage terminal $1p$ and negative voltage terminal $1n$ of single-phase 3-level inverter INV-A, and smoothens and stabilizes DC voltage EdA between terminals $1p$ and $1n$. Neutral voltage terminal $1c$ of single-phase 3-level inverter INV-A is connected to a connection point of capacitors C1 and C2. Single-phase 3-level inverter INV-A is controlled by an output signal of driver DR1, converts DC voltage EdA between positive voltage terminal $1p$ and negative voltage terminal $1n$ into an AC voltage VA, and outputs AC voltage VA between AC terminals $1a$, $1b$.

Single-phase 3-level inverter INV-B (second single-phase 3-level inverter) includes three DC terminals (a positive voltage terminal $2p$, a neutral voltage terminal $2c$, a negative voltage terminal $2n$) and two AC terminals $2a$, $2b$. Positive voltage terminal $2p$ of single-phase 3-level inverter INV-B is connected to positive voltage terminal T3 through current detector IS2, and negative voltage terminal $2n$ of single-phase 3-level inverter INV-B is connected to negative voltage terminal T4.

Capacitors C3, C4 are connected in series between positive voltage terminal $2p$ and negative voltage terminal $2n$ of single-phase 3-level inverter INV-B, and smoothens and stabilizes DC voltage EdB between terminals $2p$, $2n$. Neutral voltage terminal $2c$ of single-phase 3-level inverter INV-B is connected to a connection point of capacitors C3, C4. Single-phase 3-level inverter INV-B is controlled by an output signal of driver DR2, converts DC voltage EdB between positive voltage terminal $2p$ and negative voltage terminal $2n$ into an AC voltage VB, and outputs AC voltage VB between AC terminals $2a$, $2b$.

Insulating transformer 3 includes a primary winding $3a$ and a secondary winding $3b$, which are insulated from each other. In the description of the present application, for convenience, it is assumed that the number of turns of primary winding $3a$ is equal to the number of turns of secondary winding $3b$. One of terminals of primary winding $3a$ is connected to AC terminal $1a$ of single-phase 3-level inverter INV-A through reactor L1, and the other terminal of primary winding $3a$ is connected to AC terminal $1b$ of single-phase 3-level inverter INV-A. One of terminals of secondary winding $3b$ is connected to AC terminal $2a$ of single-phase 3-level inverter INV-B through reactor L2, and the other terminal of secondary winding $3b$ is connected to AC terminal $2b$ of single-phase 3-level inverter INV-B.

Current detector IS1 detects a DC current flowing between single-phase 3-level inverter INV-A and DC circuit 5, and outputs a detected value of the DC current to control device 4. Current detector IS2 detects the DC current flowing between single-phase 3-level inverter INV-B and DC circuit 6, and outputs the detected value of the DC current to control device 4.

Voltage detector VS1 detects the voltage at both ends of capacitor C1 (corresponding to the DC voltage between terminals $1p$, $1c$), and outputs the detected value of the voltage to control device 4. Voltage detector VS2 detects the voltage at both ends of capacitor C2 (corresponding to the DC voltage between terminals $1c$, $1n$), and outputs the detected value of the voltage to control device 4.

Voltage detector VS3 detects the voltage at both ends of capacitor C3 (corresponding to the DC voltage between terminals $2p$, $2c$), and outputs the detected value of the voltage to control device 4. Voltage detector VS4 detects the voltage at both ends of capacitor C4 (corresponding to the DC voltage between terminals $2c$, $2n$), and outputs the detected value of the voltage to control device 4.

Control device 4 is constructed with, for example, a microcomputer, and controls operation of single-phase 3-level inverters INV-A, INV-B. Although described later in detail, each of single-phase 3-level inverters INV-A, INV-B is constructed with a semiconductor switch including a semiconductor switching element. In the first embodiment, an insulated gate bipolar transistor (IGBT) is used as the semiconductor switching element. In the first embodiment, pulse width modulation (PWM) control can be applied as a system that controls the semiconductor switching element. Control device 4 receives output signals of voltage detectors VS1 to VS4 and current detectors IS1, IS2, and performs the PWM control to generate control signals of single-phase 3-level inverters INV-A, INV-B.

Driver DR1 amplifies the control signal of single-phase 3-level inverter INV-A, and supplies the amplified control signal to single-phase 3-level inverter INV-A. Driver DR2 amplifies the control signal of single-phase 3-level inverter INV-B, and supplies the amplified control signal to single-phase 3-level inverter INV-B.

Figure 2:
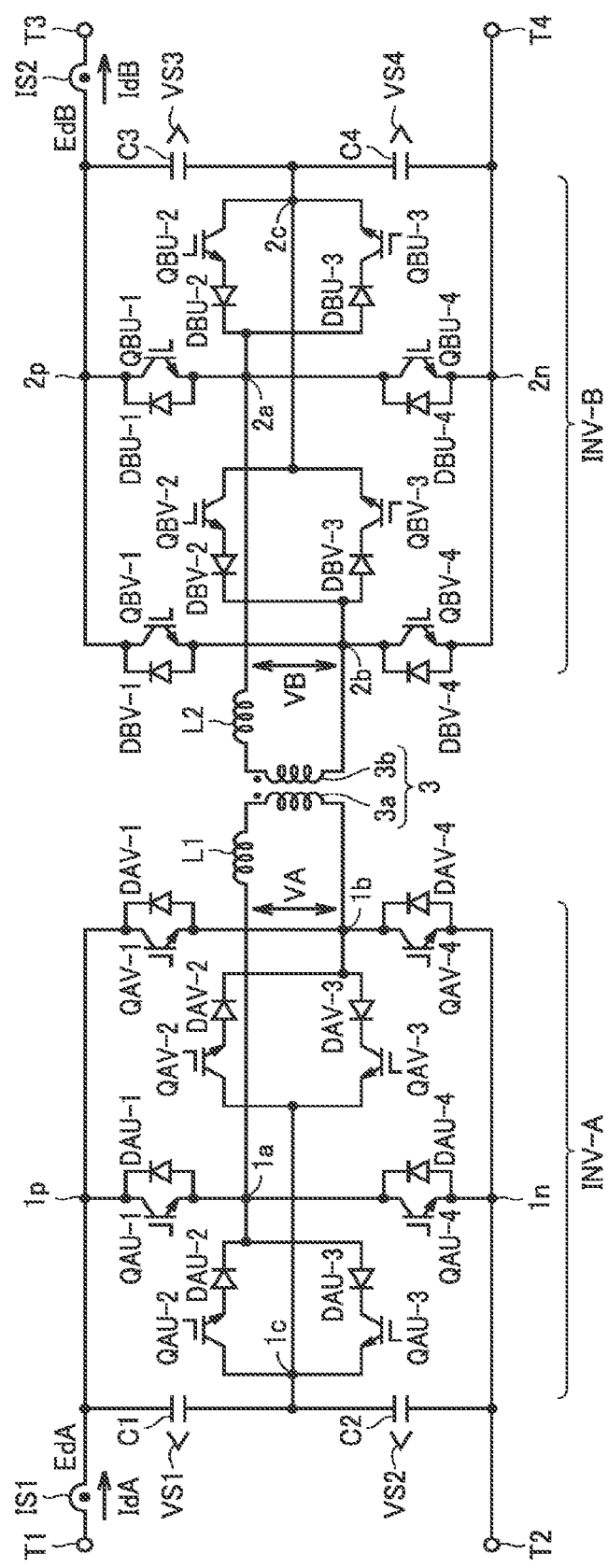
FIG. 2 is a circuit diagram illustrating a detailed configuration of a single-phase 3-level inverter in FIG. 1.

FIG. 2 is a circuit diagram illustrating detailed configurations of single-phase 3-level inverters INV-A, INV-B in FIG. 1.

Referring to FIG. 2, each of single-phase 3-level inverters INV-A, INV-B includes a U-phase arm and a V-phase arm. Each of the U-phase arm and the V-phase arm is constructed as a 3-level circuit, and includes four IGBT elements and four diodes.

More specifically, the U-phase arm (first circuit) of single-phase 3-level inverter INV-A includes IGBT elements QAU-1 to QAU-4 and diodes DAU-1 to DAU-4. The V phase arm (second circuit) of single-phase 3-level inverter INV-A includes IGBT elements QAV-1 to QAV-4 and diodes DAV-1 to DAV-4.

IGBT elements QAU-1, QAU-4 are connected in series between positive voltage terminal 1p and negative voltage terminal 1n. Diodes DAU-1, DAU-4 are connected in reversely parallel to IGBT elements QAU-1, QAU-4, respectively.

IGBT element QAU-2 and diode DAU-2 are connected in series between neutral voltage terminal 1c and AC terminal 1a. In particular, a collector of IGBT element QAU-2 is connected to neutral voltage terminal 1c, and an emitter of IGBT element QAU-2 is connected to an anode of diode DAU-2. A cathode of diode DAU-2 is connected to AC terminal 1a.

IGBT element QAU-3 and diode DAU-3 are connected in series between neutral voltage terminal 1c and AC terminal 1a. In particular, an emitter of IGBT element QAU-3 is connected to neutral voltage terminal 1c, and a collector of IGBT element QAU-3 is connected to a cathode of diode DAU-3. An anode of diode DAU-3 is connected to AC terminal 1a.

IGBT elements QAV-1, QAV-4 are connected in series between positive voltage terminal 1p and negative voltage terminal 1n. Diodes DAV-1, DAV-4 are connected in reversely parallel to IGBT elements QAV-1, QAV-4, respectively.

IGBT element QAV-2 and diode DAV-2 are connected in series between neutral voltage terminal 1c and AC terminal 1b. In particular, a collector of IGBT element QAV-2 is connected to neutral voltage terminal 1c, and an emitter of IGBT element QAV-2 is connected to an anode of diode DAV-2. A cathode of diode DAV-2 is connected to AC terminal 1b.

IGBT element QAV-3 and diode DAV-3 are connected in series between neutral voltage terminal 1c and AC terminal 1b. In particular, an emitter of IGBT element QAV-3 is connected to neutral voltage terminal 1c, and a collector of IGBT element QAV-3 is connected to a cathode of diode DAV-3. An anode of diode DAV-3 is connected to AC terminal 1b.

The U-phase arm (third circuit) of single-phase 3-level inverter INV-B includes IGBT elements QBU-1 to QBU-4 and diodes DBU-1 to DBU-4. The V-phase arm (fourth circuit) of single-phase 3-level inverter INV-B includes IGBT elements QBV-1 to QBV-4 and diodes DBV-1 to DBV-4.

IGBT elements QBU-1, QBU-4 are connected in series between positive voltage terminal 2p and negative voltage terminal 2n. Diodes DBU-1, DBU-4 are connected in reversely parallel to IGBT elements QBU-1, QBU-4, respectively.

IGBT element QBU-2 and diode DBU-2 are connected in series between neutral voltage terminal 2c and AC terminal 2a. In particular, a collector of IGBT element QBU-2 is connected to neutral voltage terminal 2c, and an emitter of IGBT element QBU-2 is connected to an anode of diode DBU-2. A cathode of diode DBU-2 is connected to AC terminal 2a.

IGBT element QBU-3 and diode DBU-3 are connected in series between neutral voltage terminal 2c and AC terminal 2a. In particular, an emitter of IGBT element QBU-3 is connected to neutral voltage terminal 2c, and a collector of IGBT element QBU-3 is connected to a cathode of diode DBU-3. An anode of diode DBU-3 is connected to AC terminal 2a.

IGBT elements QBV-1, QBV-4 are connected in series between positive voltage terminal 2p and negative voltage terminal 2n. Diodes DBV-1, DBV-4 are connected in reversely parallel to IGBT elements QBV-1, QBV-4, respectively.

IGBT element QBV-2 and diode DBV-2 are connected in series between neutral voltage terminal 2c and AC terminal 2b. In particular, a collector of IGBT element QBV-2 is connected to neutral voltage terminal 2c, and an emitter of IGBT element QBV-2 is connected to an anode of diode DBV-2. A cathode of diode DBV-2 is connected to AC terminal 2b.

IGBT element QBV-3 and diode DBV-3 are connected in series between neutral voltage terminal 2c and AC terminal 2b. In particular, an emitter of IGBT element QBV-3 is connected to neutral voltage terminal 2c, and a collector of IGBT element QBV-3 is connected to a cathode of diode DBV-3. An anode of diode DBV-3 is connected to AC terminal 2b.

(Operation of Bidirectional Insulating DC/DC Converter)

Figure 3:
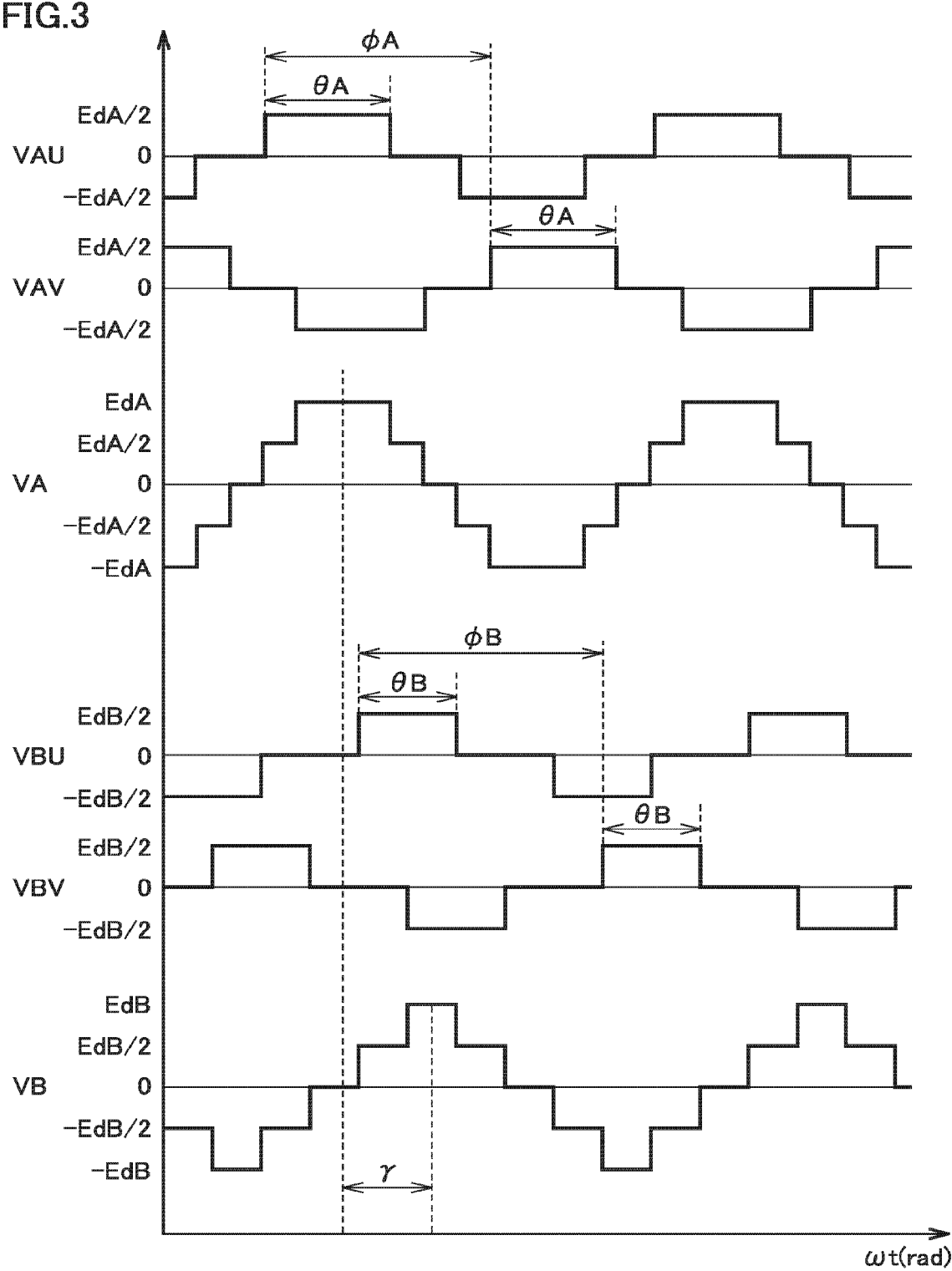
FIG. 3 is a waveform diagram illustrating a relationship among a U-phase voltage, a V-phase voltage, and an AC voltage of the single-phase 3-level inverter.

FIG. 3 is a waveform diagram illustrating a relationship among a U-phase voltage VAU, a V-phase voltage VAV, and AC voltage VA of single-phase 3-level inverter INV-A and a relationship among a U-phase voltage VBU, a V-phase voltage VBV, and AC voltage VB of single-phase 3-level inverter INV-B.

First, operation of single-phase 3-level inverter INV-A will be described with reference to FIG. 3.

In single-phase 3-level inverter INV-A, both U-phase voltage VAU and V-phase voltage VAV may take three values of ±EdA/2, 0 with respect to the neutral point which is the connection point of capacitors C1, C2. In the following, reference signs AU, AV are collectively denoted by a reference sign Ax in order to comprehensively describe the U-phase IGBT element, the diode, the V-phase IGBT element, and the diode of single-phase 3-level inverter INV-A. AC terminals 1a, 1b are collectively denoted by an AC terminal 1.

Positive voltage terminal 1p and AC terminal 1 are connected to each other in a period during which an IGBT element QAx-1 is turned on and IGBT elements QAx-2, QAx-3, QAx-4 are turned off, so that an output voltage VAx becomes +EdA/2.

Neutral voltage terminal 1c and AC terminal 1 are connected to each other in a period during which IGBT elements QAx-2, QAx-3 are turned on and IGBT elements QAx-1, QAx-4 are turned off, so that output voltage VAx becomes zero.

On the other hand, negative voltage terminal 1n and AC terminal 1 are connected to each other in a period during which IGBT element QAx-4 is turned on and IGBT elements QAx-1, QAx-2, QAx-3 are turned off, so that output voltage VAx becomes −EdA/2.

A line voltage (=VAU−VAV) that is a difference between U-phase voltage VAU and V-phase voltage VAV is output between AC terminal 1a and AC terminal 1b of single-phase 3-level inverter INV-A. That is, AC voltage VA takes five values of ±EdA, ±EdA/2, 0.

Next, the operation of single-phase 3-level inverter INV-B will be described below.

In single-phase 3-level inverter INV-B, similarly to single-phase 3-level inverter INV-A, both U-phase voltage VBU and V-phase voltage VBV may take three values of ±EdB/2, 0 with respect to the neutral point that is the connection point of capacitors C3, C4. In the following, reference signs BU, BV are collectively denoted by a reference sign Bx in order to comprehensively describe the U-phase IGBT element, the diode, the V-phase IGBT element, and the diode of single-phase 3-level inverter INV-B. AC terminals 2a, 2b are collectively referred to as an AC terminal 2.

Positive voltage terminal 2p and AC terminal 2 are connected to each other in a period during which an IGBT element QBx-1 is turned on and IGBT elements QBx-2, QBx-3, QBx-4 are turned off, so that output voltage VBx becomes +EdB/2.

Neutral voltage terminal 2c and AC terminal 2 are connected to each other in a period during which IGBT elements QBx-2, QBx-3 are turned on and IGBT elements QBx-1, QBx-4 are turned off, so that output voltage VBx becomes zero.

On the other hand, negative voltage terminal 2n and AC terminal 2 are connected to each other in a period during which IGBT element QBx-4 is turned on and IGBT elements QBx-1, QBx-2, QBx-3 are turned off, so that output voltage VBx becomes −EdB/2.

A line voltage (=VBU−VBV) that is a difference between U-phase voltage VBU and V-phase voltage VBV is output between AC terminal 2a and AC terminal 2b of single-phase 3-level inverter INV-B. That is, AC voltage VB takes five values of ±EdB, ±EdB/2, 0.

Hereinafter, it is assumed that a pulse width of U-phase voltage VAU and a pulse width of V-phase voltage VAV are an identical pulse width θA, and that a phase difference between U-phase voltage VAU and V-phase voltage VAV is ϕA. It is assumed that a pulse width of U-phase voltage VBU and a pulse width of V-phase voltage VBV are an identical pulse width θB, and that a phase difference between U-phase voltage VBU and V-phase voltage VBV is ϕB. It is assumed that a phase difference between AC voltage VA and AC voltage VB is γ.

(Nth Harmonic Component of Output AC Voltage of Single-phase 3-level Inverter)

An nth harmonic component of the AC voltage output from each single-phase 3-level inverter will be described below.

In the following, in order to comprehensively describe the voltage waveform of single-phase 3-level inverter INV-A in FIG. 3 and the voltage waveform of single-phase 3-level inverter INV-B in FIG. 3, U-phase voltages VAU, VBU are comprehensively represented by a U-phase voltage VU, V-phase voltages VAV, VBV are comprehensively represented by a V-phase voltage VV, and AC voltages VA, VB are comprehensively represented by an AC voltage V. DC voltages EdA, EdB are comprehensively represented by a DC voltage Ed, pulse widths θA, θB are comprehensively represented by a pulse width θ, and phase differences ϕA, ϕB are comprehensively represented by a phase difference ϕ.

Through Fourier series expansion of the voltage waveforms of U-phase voltage VU and V-phase voltage VV in FIG. 3, U-phase voltage VU and V-phase voltage VV can be given by the following equations (1), (2).

$$V_U = \frac{4}{\pi} \times \frac{E_d}{2} \sum_{n=1,3,5...}^{\infty} \sin\frac{n\theta}{2} \cdot \sin n\left(\omega t + \frac{\phi}{2}\right) \quad (1)$$

$$V_V = \frac{4}{\pi} \times \frac{E_d}{2} \sum_{n=1,3,5...}^{\infty} \sin\frac{n\theta}{2} \cdot \sin n\left(\omega t - \frac{\phi}{2}\right) \quad (2)$$

AC voltage V is a difference (line voltage) between U-phase voltage VU and V-phase voltage VV, and is given by the following equation (3).

$$V = V_U - V_V \quad (3)$$

When the equations (1), (2) are substituted for the equation (3), an nth harmonic component vn of AC voltage V is given by the following equation (4).

$$v_n = \frac{4}{n\pi} E_d \cdot \sin\frac{n\theta}{2} \cdot \sin\frac{n\phi}{2} \cdot \cos n\omega t \quad (4)$$

Assuming that an amplitude of the nth harmonic component is Vn, an amplitude Vn is given by the following equation (5).

$$V_n = \frac{4}{n\pi} E_d \cdot \sin\frac{n\theta}{2} \cdot \sin\frac{n\phi}{2} \quad (5)$$

As can be seen from the equation (5), amplitude Vn of the nth harmonic component is determined by pulse widths θ of U-phase voltage VU and V-phase voltage VV and phase difference ϕ between U-phase voltage VU and V-phase voltage VV. In other words, it can be seen that amplitude Vn of the nth harmonic component has two degrees of freedom (pulse width θ, phase difference ϕ).

Based on the above knowledge, in the first embodiment, one of pulse width θ and phase difference ϕ is set such that the amplitude Vn of the nth harmonic component of the AC voltage becomes zero. Consequently, the nth harmonic wave component can be suppressed.

In particular, as the first control method, phase difference ϕ satisfying sin(nϕ/2)=0 in the equation (5) is set as a first control system. According to the first control system, because amplitude Vn of the nth harmonic wave component becomes zero, the nth harmonic wave component is suppressed. Alternatively, pulse width θ satisfying sin(nθ/2)=0 in the equation (5) is set as a second control system. Also in the second control system, because amplitude Vn of the nth harmonic wave component becomes zero, the nth harmonic wave component is suppressed.

A control system (first control system) that sets phase difference $\phi$ such that amplitude Vn of the nth harmonic component of the AC voltage becomes zero is adopted in the first embodiment. A control system (second control system) that sets pulse width $\theta$ such that amplitude Vn of the nth harmonic component of the AC voltage becomes zero will be described in a second embodiment.

In the first embodiment, in order to reduce a third harmonic component, phase difference $\phi$ is set such that amplitude Vn (n=3) of the third harmonic component becomes zero. Specifically, when $\pi<\phi<2\pi$ is defined, $3\phi/2=2\pi$ satisfies sin $(3\phi/2)=0$. That is, phase difference $\phi$ may be set to $4\pi/3$ in order to reduce the tertiary harmonic component.

In the first embodiment, pulse widths $\theta A$ and $\theta B$ are controlled according to the level difference of DC voltage EdA and DC voltage EdB such that an effective value of the fundamental-wave component of AC voltage VA is matched with an effective value of the fundamental-wave component of AC voltage B.

A control configuration of the bidirectional insulated DC/DC converter of the first embodiment will be described below.

(Control Configuration of Bidirectional Insulating DC/DC Converter)

Figure 4:
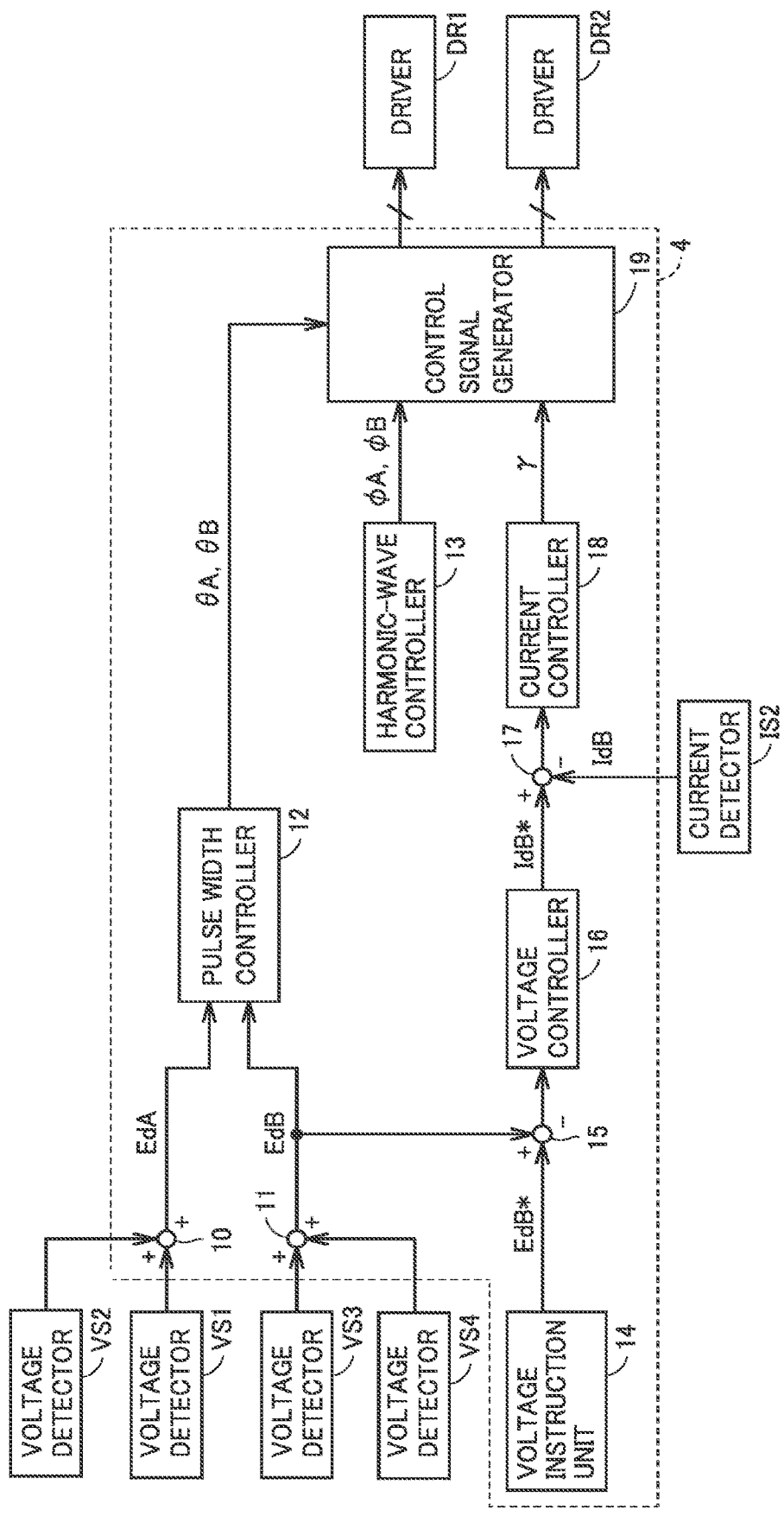
FIG. 4 is a functional block diagram of a control device in FIG. 1.

FIG. 4 is a functional block diagram of control device 4 in FIG. 1. However, the control configuration in the case that the DC power is supplied from DC circuit 5 to DC circuit 6 is illustrated in FIG. 4. In the case that the DC power is supplied from DC circuit 6 to DC circuit 5, for example, voltage detectors VS1, VS2 are replaced with voltage detectors VS3, VS4, respectively by a switching circuit, and current detector IS2 is replaced with current detector IS1 by the switching circuit.

Referring to FIG. 4, control device 4 includes adders 10, 11, a pulse width controller 12, a harmonic-wave controller 13, a voltage command unit 14, subtractors 15, 17, a voltage controller 16, a current controller 18, and a control signal generator 19. Control device 4 controls the operation of single-phase 3-level inverters INV-A, INV-B by performing the following four steps (1) to (4).

(1) Control of Phase Difference $\gamma$

Bidirectional insulated DC/DC converter 1 can supply the power from DC circuit 5 to DC circuit 6 through single-phase 3-level inverters INV-A, INV-B by providing a phase difference y between AC voltage VA and AC voltage VB. Alternatively, bidirectional insulated DC/DC converter 1 can supply the power from DC circuit 6 to DC circuit 5 through single-phase 3-level inverters INV-B, INV-A. A principle will be described below.

Figure 5:
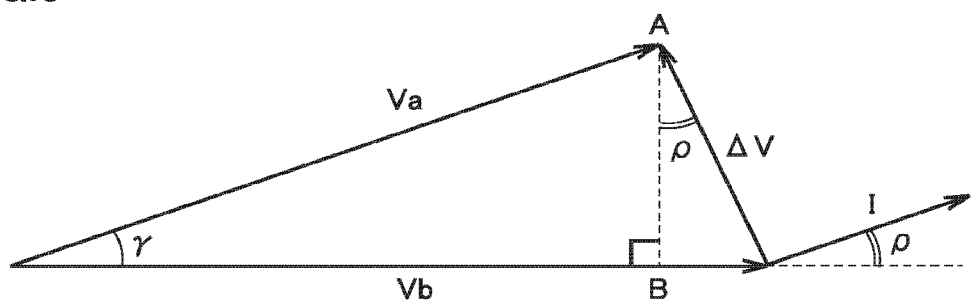
FIG. 5 is a vector diagram of an AC fundamental-wave voltage when power is transmitted from a single-phase 3-level inverter INV-A to a single-phase 3-level inverter INV-B.

FIG. 5 is a vector diagram of an AC fundamental-wave voltage when the power is transmitted from single-phase 3-level inverter INV-A to single-phase 3-level inverter INV-B.

In FIG. 5, it is assumed that a fundamental-wave component of AC voltage VA of single-phase 3-level inverter INV-A is an AC fundamental-wave voltage Va, and that a fundamental-wave component of AC voltage VB of single-phase 3-level inverter INV-B is an AC fundamental-wave voltage Vb. AC fundamental-wave voltage Va is advanced and AC fundamental-wave voltage Vb is delayed. A phase difference between Va and Vb is $\gamma$.

In FIG. 5, $\Delta$V is a voltage difference between Va and Vb. i is current flowing due to voltage $\Delta$V of the difference between Va and Vb. Current i can be given by the following equation (6). $\rho$ is a power factor angle. L is a sum of leakage inductance of insulated transformer 3 and reactors L1, L2.

$$i = \frac{V_a - V_b}{\omega L} \quad (6)$$

In the vector diagram of FIG. 5, a length of a line segment AB is given by the following equation (7).

$$AB = V_a \sin \gamma = \omega L i \cos \rho \quad (7)$$

The effective power is P=Vb·icosρ, so that the following equation (8) is obtained using the equation (7).

$$P = V_b \cdot i \cos\rho = V_b \cdot \frac{V_a}{\omega L}\sin\gamma = \frac{V_a V_b}{\omega L}\sin\gamma \quad (8)$$

Thus, because the effective power changes by phase difference $\gamma$, the power supply can be controlled between DC circuit 5 and DC circuit 6 by controlling phase difference $\gamma$.

Referring to FIG. 4, voltage command unit 14 generates a target voltage EdB* of DC voltage EdB. Subtractor 15 obtains a deviation (=EdB*−EdB) between target voltage EdB* and DC voltage EdB obtained by adder 11. Voltage controller 16 generates a current command value IdB* based on the deviation obtained by subtractor 15.

Subtractor 17 obtains a deviation (=IdB*−IdB) between current command value IdB* generated by voltage controller 16 and DC current IdB detected by current detector IS2. The current controller 18 generates phase difference $\gamma$ based on the deviation obtained by subtractor 17.

(2) Setting of Phase Difference $\phi$

Harmonic-wave controller 13 sets phase differences $\phi$A, $\phi$B such that the amplitudes of the nth harmonic components of AC voltages VA and VB become zero. For example, in order to reduce the third harmonic component, harmonic-wave controller 13 sets phase differences $\phi$A, $\phi$B such that amplitude Vn (n=3) of the third harmonic component becomes zero. Specifically, harmonic-wave controller 13 sets each of phase differences $\phi$A, $\phi$B to $4\pi/3$ ($\phi$A=$\phi$B=$4\pi/3$) such that sin $(3\phi/2)=0$ is satisfied in the equation (5).

(3) Control of Pulse Widths $\theta A$, $\theta B$

As described in the above (2), the power supply can be controlled between DC circuit 5 and DC circuit 6 by controlling phase difference $\gamma$ between AC fundamental-wave voltages Va and AC fundamental-wave voltage Vb.

Figure 6A:
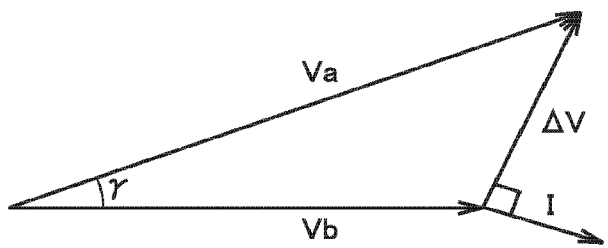
FIG. 6A is a vector diagram of the AC fundamental-wave voltage when the power is transmitted from the single-phase 3-level inverter INV-A to the single-phase 3-level inverter INV-B.
Figure 6B:
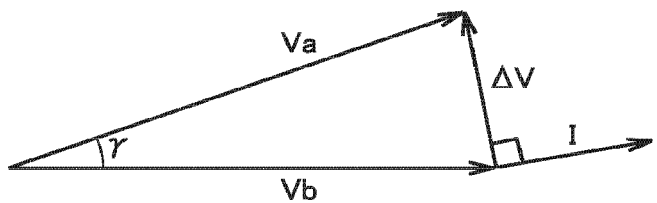
FIG. 6B is a vector diagram of the AC fundamental-wave voltage when the power is transmitted from the single-phase 3-level inverter INV-A to the single-phase 3-level inverter INV-B.
Figure 6C:
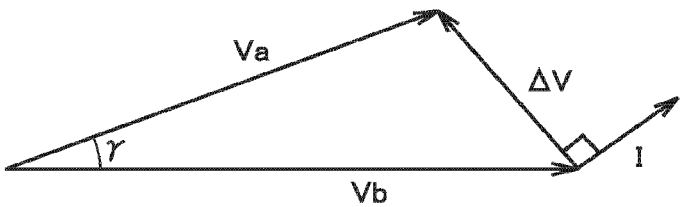
FIG. 6C is a vector diagram of the AC fundamental-wave voltage when the power is transmitted from the single-phase 3-level inverter INV-A to the single-phase 3-level inverter INV-B.

FIGS. 6A to 6C are vector diagrams of the AC fundamental-wave voltage when the power is transmitted from single-phase 3-level inverter INV-A to single-phase 3-level inverter INV-B. In FIGS. 6A to 6C, $\Delta$V is the voltage difference between Va and Vb. i is current flowing due to the voltage difference $\Delta$V between Va and Vb.

AC fundamental-wave voltages Va, Vb are given by the following equations (9), (10) by substituting n=1 into the equation (4).

$$V_a = \frac{4}{\pi} E_{dA} \cdot \sin\frac{\theta_A}{2} \cdot \sin\frac{\phi_A}{2} \quad (9)$$

$$V_b = \frac{4}{\pi} E_{dB} \cdot \sin\frac{\theta_B}{2} \cdot \sin\frac{\phi_B}{2} \quad (10)$$

In the first embodiment, phase difference $\phi$A and phase difference $\phi$B are equal to each other (=$4\pi/3$) according to the above (2). When pulse width θA is set equal to pulse width θB, the level difference between the effective value of AC fundamental-wave voltage Va and the effective value of AC fundamental-wave voltage Vb is decided by the level difference between DC voltage EdA and DC voltage EdB.

FIG. 6A illustrates a relationship between AC basic wave voltages Va, Vb when DC voltage EdA is higher than DC voltage EdB (EdA>EdB). In this case, the power factor of current i is degraded clockwise with respect to both Va, Vb. Thus, it can be said that the power factor is poor.

FIG. 6B illustrates the relationship between AC basic wave voltages Va, Vb when DC voltage EdA and DC voltage EdB are equal to each other (EdA=EdB). In this case, the power factor of current i is as good as $\cos(\gamma/2)$ with respect to both Va, Vb. Thus, it can be said that the power factor is good.

FIG. 6C illustrates the relationship between AC basic wave voltages Va, Vb when DC voltage EdA is lower than DC voltage EdB (EdA<EdB). In this case, the power factor of current i is degraded counterclockwise with respect to both Va, Vb. Thus, it can be said that the power factor is poor.

As described above, when pulse width θA is set equal to pulse width θB, the power factor is degraded for EdA>EdB (FIG. 6A) or EdA<EdB (FIG. 6C). In order to improve the power factor, preferably the effective value of AC fundamental-wave voltage Va and the effective value of AC fundamental-wave voltage Vb are equal to each other.

For this reason, in the first embodiment, pulse widths θA and θB are controlled such that the effective value of AC fundamental-wave voltage Va is equal to the effective value of AC fundamental-wave voltage Vb. Specifically, pulse width θ of the AC voltage corresponding to the lower DC voltage of DC voltages EdA, EdB is fixed to π, and pulse width θ of the AC voltage corresponding to the higher DC voltage is narrowed, thereby the effective value of AC fundamental-wave voltage Va and the effective value of AC fundamental-wave voltage Vb are matched with each other.

For example, for EdA>EdB, by setting pulse width θB to π in the equations (9), (10), pulse width θA for matching the effective value of Va with the effective value of Vb is given by the following equation (11)

$$\theta_A = 2\sin^{-1}\left(\frac{E_{dB}}{E_{dA}}\right) \quad (11)$$

Similarly, for EdA<EdB, by setting pulse width θA to π in the equations (9), (10), pulse width θB for matching the effective value of Va with the effective value of Vb is given by the following equation (12).

$$\theta_B = 2\sin^{-1}\left(\frac{E_{dA}}{E_{dB}}\right) \quad (12)$$

Referring to FIG. 4, adder 10 adds the voltage at both the ends of capacitor C1 detected by voltage detector VS1 and the voltage at both the ends of capacitor C2 detected by voltage detector VS2, and outputs DC voltage EdA between positive voltage terminal 1p and negative voltage terminal 1n.

Adder 11 adds the voltage at both the ends the capacitor C3 detected by voltage detector VS3 and the voltage at both the ends of capacitor C4 detected by voltage detector VS4, and outputs DC voltage EdB between positive voltage terminal 2p and negative voltage terminal 2n.

Pulse width controller 12 calculates pulse width θA from x=EdB/EdA and θA=2sin$^{-1}$(x). Pulse width controller 12 also calculates pulse width θB from y=EdA/EdB and θB=2sin$^{-1}$(y). However, a limiter is provided such that each of x and y becomes less than or equal to 1.

For example, for EdA=150 and EdB=100, x=⅔ and y=3/2 are obtained because of EdB/EdA=⅔ and EdA/EdB=3/2. Thus, θA=2sin$^{-1}$(⅔) and θB=π are obtained.

For EdA=100 and EdB=150, x=½ and y=⅔ are obtained because of EdB/EdA=3/2 and EdA/EdB=⅔. Thus, θA=π, θB=2sin$^{-1}$(⅔) are obtained.

(4) Generation of Control Signal

Control signal generator 19 generates the control signals of single-phase 3-level inverters INV-A, INV-B based on phase differences φA, φB set by harmonic-wave controller 13, phase difference γ generated by current controller 18, and pulse widths θA, θB generated by pulse width controller 12.

A method for generating the control signal of each single-phase 3-level inverter will be described below with reference to FIGS. 7 and 8.

Figure 7:
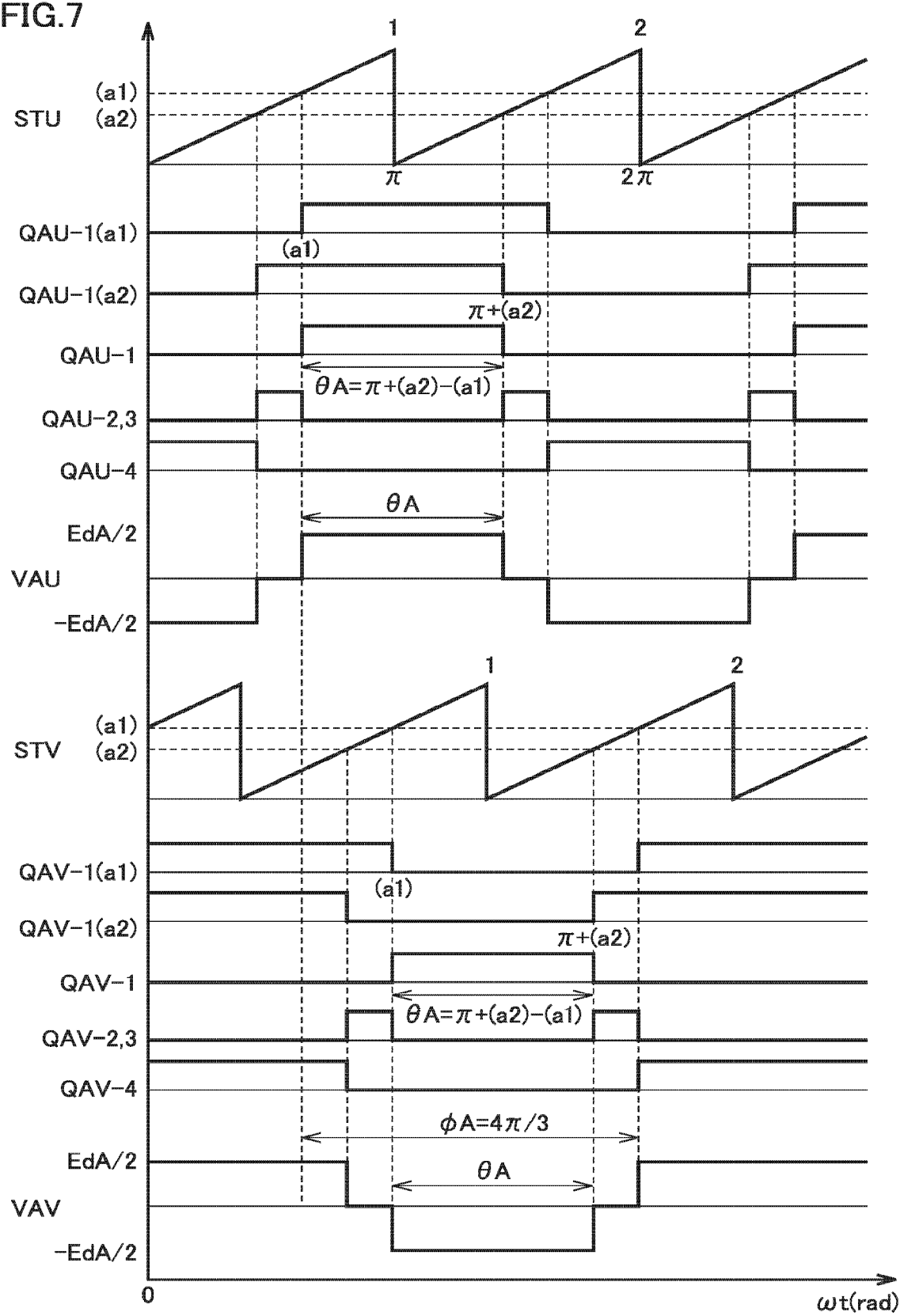
FIG. 7 is a timing chart illustrating a method for generating a control signal of the single-phase 3-level inverter INV-A of the first embodiment.
Figure 8:
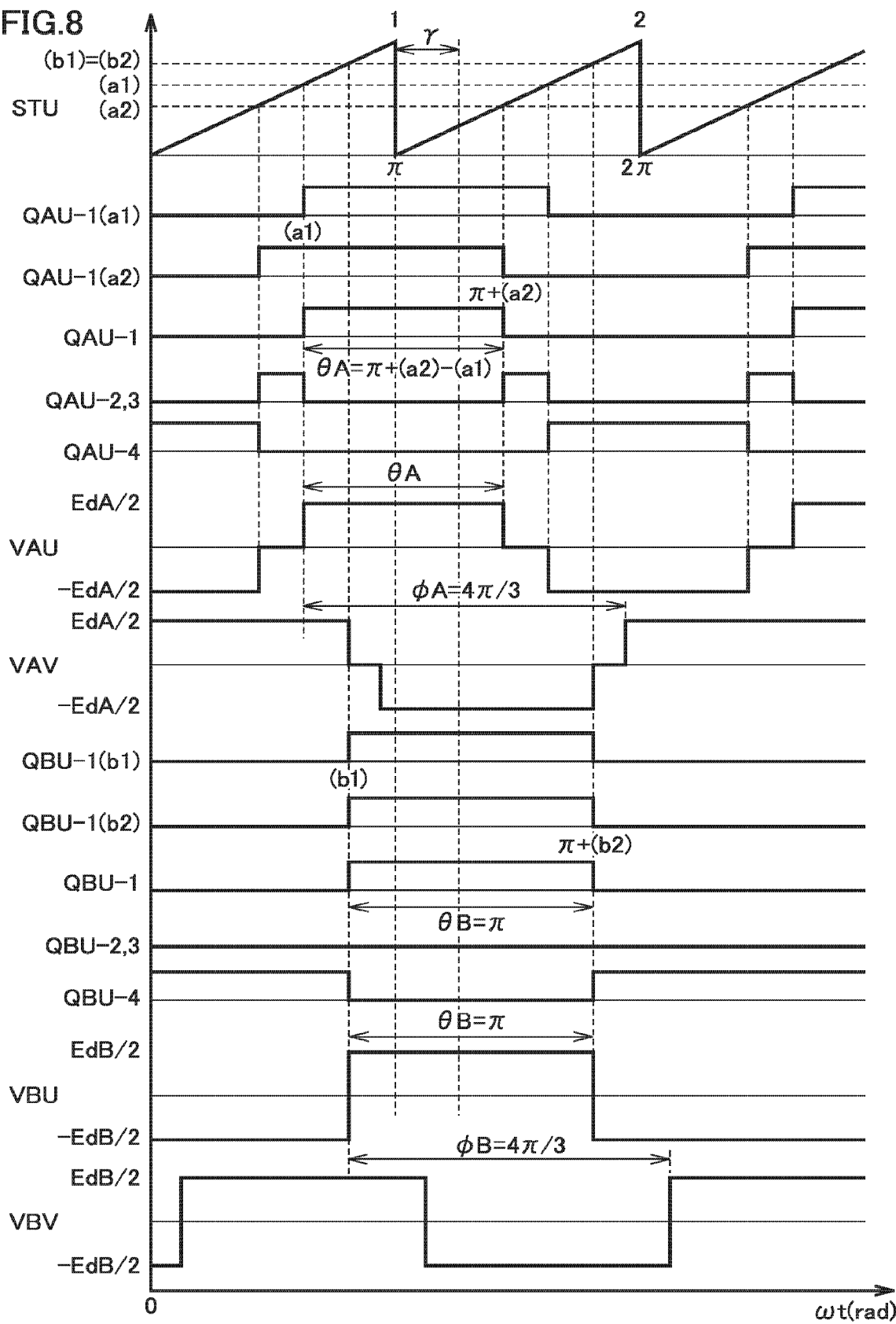
FIG. 8 is a timing chart illustrating a method for generating control signals of the single-phase 3-level inverters INV-A, INV-B of the first embodiment.

In FIGS. 7 and 8, single-phase 3-level inverter INV-A is advanced and single-phase 3-level inverter INV-B is delayed. That is, the power is supplied from single-phase 3-level inverter INV-A to single-phase 3-level inverter INV-B.

In FIGS. 7 and 8, it is assumed that DC voltage EdA is higher than DC voltage EdB (EdA>EdB). Thus, in the control of pulse widths θA, θB described above, pulse width θB is fixed to π and pulse width θA is narrowed, thereby the effective value of AC fundamental-wave voltage Va and the effective value of AC fundamental-wave voltage Vb are matched with each other.

FIG. 7 is a timing chart illustrating the method of generating the control signal of single-phase 3-level inverter INV-A of the first embodiment.

Control signal generator 19 generates a sawtooth wave signal STU having a frequency double AC fundamental-wave voltage Va. It is assumed that sawtooth wave signal STU oscillate between 0 and π, and that sawtooth wave signal STU has a cycle of π.

Subsequently, control signal generator 19 generates two reference signals (a1), (a2) each of which is compared to sawtooth wave signal STU.

First reference signal (a1) is used to decide rise and fall of a first rectangular wave QAU-1 (a1) of IGBT element QAU-1 of single-phase 3-level inverter INV-A. First reference signal (a1) is given by the following equation (13).

$$(a1) = \frac{\pi}{2} + \left(-\frac{\gamma}{2} + \frac{\pi}{2} - \frac{\theta_A}{2}\right) \quad (13)$$

First reference signal (a1) and sawtooth wave signal STU intersect each other in each cycle. When sawtooth wave signal STU intersects first reference signal (a1) in an odd-numbered cycle, first rectangular wave QAU-1 (a1) rises from an L level to an H level. When sawtooth wave signal STU intersects first reference signal (a1) in an even-numbered cycle, first rectangular wave QAU-1 (a1) falls from the H level to the L level.

Second reference signal (a2) is used to decide the rise and fall of a second rectangular wave QAU-1 (a2) of IGBT element QAU-1 of single-phase 3-level inverter INV-A. Second reference signal (a2) is given by the following equation (14).

$$(a2) = \frac{\pi}{2} + \left(-\frac{\gamma}{2} - \frac{\pi}{2} + \frac{\theta_A}{2}\right) \quad (14)$$

Second reference signal (a2) and sawtooth wave signal STU intersect each other in each cycle. When sawtooth wave signal STU intersects second reference signal (a2) in the odd-numbered cycle, second rectangular wave QAU-1 (a2) rises from the L level to the H level. When sawtooth wave signal STU intersects second reference signal (a2) in the even-numbered cycle, second rectangular wave QAU-1 (a2) falls from the H level to the L level.

Control signal generator 19 calculates a logical product (AND) of first rectangular wave QAU-1 (a1) and second rectangular wave QAU-1 (a2) to generate the control signal of IGBT element QAU-1.

Control signal generator 19 also calculates a logical product of an inversion signal (reverse phase signal) of first rectangular wave QAU-1 (a1) and second rectangular wave QAU-1 (a2) 1, and calculates a logical product of first rectangular wave QAU-1 (a1) and an inversion signal of second rectangular wave QAU-1 (a2). Then, control signal generator 19 calculates a logical sum (OR) of the two logical products to generate the control signals of IGBT elements QAU-2, QAU-3.

Control signal generator 19 further calculates a logical product of the inversion signal of first rectangular wave QAU-1 (a1) and the inversion signal of second rectangular wave QAU-1 (a2) to generate the control signal of IGBT element QAU-4.

Subsequently, control signal generator 19 generates a sawtooth wave signal STV in which sawtooth wave signal STU is delayed by π/3. It is assumed that sawtooth wave signal STV oscillates between 0 and π, and that the cycle of sawtooth wave signal STV is set to π. The phase difference of π/3 of sawtooth wave signal STV to sawtooth wave signal STU is obtained by subtracting π from phase difference φ (=4π/3) for setting the amplitude of the third harmonic wave component to zero.

First reference signal (a1) is used to decide the rise and fall of a third rectangular wave QAV-1 (a1) of IGBT element QAV-1 of single-phase 3-level inverter INV-A. First reference signal (a1) and sawtooth wave signal STV intersect each other in each cycle. When sawtooth wave signal STV intersects first reference signal (a1) in the odd-numbered cycle, third rectangular wave QAV-1 (a1) falls from the H level to the L level. When sawtooth wave signal STV intersects first reference signal (a1) in the even-numbered cycle, third rectangular wave QAV-1 (a1) rises from the L level to the H level.

Second reference signal (a2) is used to decide the rise and fall of a fourth rectangular wave QAV-1 (a2) of IGBT element QAV-1 of single-phase 3-level inverter INV-A. Second reference signal (a2) and sawtooth wave signal STV intersect each other in each cycle. When sawtooth wave signal STV intersects second reference signal (a2) in the odd-numbered cycle, fourth rectangular wave QAV-1 (a2) falls from the H level to the L level. When sawtooth wave signal STV intersects second reference signal (a2) in the even-numbered cycle, fourth rectangular wave QAV-1 (a2) rises from the L level to the H level.

Control signal generator 19 calculates the logical product of the inversion signal of third rectangular wave QAV-1 (a1) and the inversion signal of fourth rectangular wave QAV-1 (a2) to generate the control signal of IGBT element QAV-1.

Control signal generator 19 also calculates the logical product of third rectangular wave QAV-1 (a1) and the inversion signal of fourth rectangular wave QAV-1 (a2), and calculates the logical product of the inversion signal of third rectangular wave QAV-1 (a1) and fourth rectangular wave QAV-1 (a2). Then, control signal generator 19 calculates the logical sum of the two logical products to generate the control signals of IGBT elements QAV-2, QAV-3.

Control signal generator 19 further calculates the logical product of third rectangular wave QAV-1 (a1) and fourth rectangular wave QAV-1 (a2) to generate the control signal of IGBT element QAV-4.

In two reference signals (a1), (a2), π+(a2)−(a1)=θA is obtained. Consequently, as illustrated in FIG. 7, both the pulse widths of U-phase voltage VAU and V-phase voltage VAV become θA. Phase difference φA between U-phase voltage VAU and V-phase voltage VAV becomes φA=4π/3 by delaying sawtooth wave signal STV by π/3 with respect to sawtooth wave signal STU.

FIG. 8 is a timing chart illustrating the method for generating the control signals of single-phase 3-level inverters INV-A, INV-B of the first embodiment. The method for generating the control signal of single-phase 3-level inverter INV-A is the same as that described with reference to FIG. 7. Thus, the method for generating the control signal for single-phase 3-level inverter INV-B will be described.

Control signal generator 19 generates two reference signals (b1), (b2) each of which is compared to a sawtooth wave signal ST.

Third reference signal (b1) is used to decide the rise and fall of first rectangular wave QBU-1 (b1) of IGBT element QBU-1 of single-phase 3-level inverter INV-B. Third reference signal (b1) is given by the following equation (15).

$$(b1) = \frac{\pi}{2} + \left(\frac{\gamma}{2} + \frac{\pi}{2} - \frac{\theta_B}{2}\right) \quad (15)$$

Third reference signal (b1) and sawtooth wave signal ST intersect each other in each cycle. When sawtooth wave signal ST intersects third reference signal (b1) in the odd-numbered cycle, first rectangular wave QBU-1 (b1) rises from the L level to the H level. When sawtooth wave signal ST intersects third reference signal (b1) in the even-numbered cycle, first rectangular wave QBU-1 (b1) falls from the H level to the L level.

Fourth reference signal (b2) is used to decide the rise and fall of second rectangular wave QBU-1 (b2) of IGBT element QBU-1 of single-phase 3-level inverter INV-B. Fourth reference signal (b2) is given by the following equation (16).

$$(b2) = \frac{\pi}{2} + \left(\frac{\gamma}{2} - \frac{\pi}{2} + \frac{\theta_B}{2}\right) \quad (16)$$

In FIG. 8, because of pulse width θB=π, third reference signal (b1) and fourth reference signal (b2) are equal to each other.

Fourth reference signal (b2) and sawtooth wave signal ST intersect each other in each cycle. When sawtooth wave signal ST intersects fourth reference signal (b2) in the odd-numbered cycle, second rectangular wave QBU-1 (b2) rises from the L level to the H level. When sawtooth wave signal ST intersects fourth reference signal (b2) in the even-numbered cycle, second rectangular wave QBU-1 (b2) falls from the H level to the L level.

Control signal generator 19 generates the control signal of IGBT element QBU-1 by calculating the logical product of first rectangular wave QBU-1 (b1) and second rectangular wave QBU-1 (b2). Control signal generator 19 also calculates the logical product of the inversion signal of first rectangular wave QBU-1 (b1) and second rectangular wave QBU-1 (b2), and calculates the logical product of first rectangular wave QBU-1 (b1) and the inversion signal of second rectangular wave QBU-1 (b2). Then, control signal generator 19 calculates the logical sum of the two logical products to generate the control signals of IGBT elements QBU-2, QBU-3. Control signal generator 19 further calculates the logical product of the inversion signal of first rectangular wave QBU-1 (b1) and the inversion signal of second rectangular wave QBU-1 (b2) to generate the control signal of IGBT element QBU-4.

Although not illustrated, control signal generator 19 further generates control signals of IGBT elements QBV-1 to QBV-4 by comparing sawtooth wave signal STV in which sawtooth wave signal ST is delayed by $\pi/3$ to third and fourth reference signals (b1), (b2).

Because two reference signals (b1), (b2) are equal to each other, $\pi=(b2)-(b1)=\pi$ is obtained. Consequently as illustrated in FIG. 8, both the pulse widths of U-phase voltage VBU and V-phase voltage VBV become $\theta B=\pi$. Phase difference $\phi B$ between U-phase voltage VBU and V-phase voltage VBV becomes $\phi B=4\pi/3$ by delaying sawtooth wave signal STV by $\pi/3$ with respect to sawtooth wave signal ST.

(Modification of First Embodiment)

In the first embodiment, the effective values of the AC fundamental voltages Va, Vb are matched with each other by narrowing pulse width $\theta$ of the AC voltage corresponding to the higher DC voltage in DC voltages EdA, EdB. However, the present invention is not limited to the first embodiment, but pulse width $\theta$ of the AC voltage may be narrowed such that the difference between the effective values of the AC fundamental-wave voltages Va, Vb is less than or equal to a predetermined value. Alternatively, pulse width $\theta$ of the AC voltage may be narrowed such that a ratio of the difference between the effective values of the AC fundamental-wave voltages Va, Vb and the effective value of Va or Vb is less than or equal to several percent.

[Second Embodiment]

A control system that sets pulse width $\theta$ such that amplitude Vn of the nth harmonic component of the AC voltage becomes zero will be described in a second embodiment. In this control system, for example, in order to reduce the third harmonic component, pulse width $\theta$ is set such that amplitude Vn (n=3) of the third harmonic component becomes zero. Specifically, when $0<\theta<\pi$ is defined, $3\theta/2=\pi$ satisfies sin $(3\theta/2)=0$. That is, pulse width $\theta$ may be set to $2\pi/3$ in order to reduce the third harmonic component.

Additionally, in the second embodiment, phase differences $\phi A$, $\phi B$ is controlled according to the level difference of DC voltage EdA and DC voltage EdB such that the effective value of AC fundamental-wave voltage Va and the effective value of AC fundamental-wave voltage Vb are matched with each other.

A control configuration of a bidirectional insulated DC/DC converter according to the second embodiment will be described below.

(Control Configuration of Bidirectional Insulated DC/DC Converter)

Figure 9:
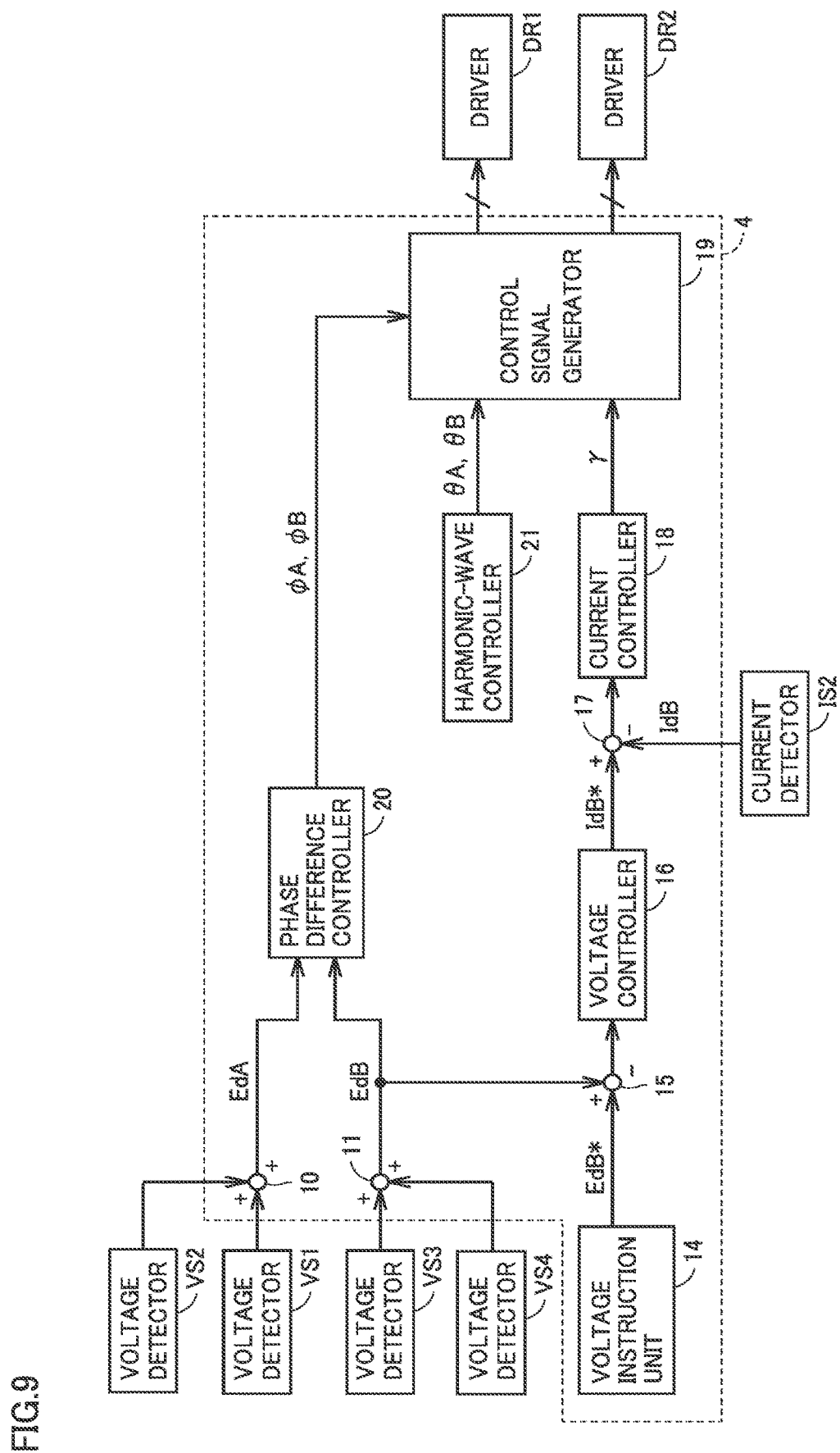
FIG. 9 is a functional block diagram of the control device in FIG. 1.

FIG. 9 is a functional block diagram of control device 4 in FIG. 1. However, the control configuration in the case that the DC power is supplied from DC circuit 5 to DC circuit 6 is illustrated in FIG. 9. In the case that the DC power is supplied from DC circuit 6 to DC circuit 5, for example, voltage detectors VS1, VS2 are replaced with voltage detectors VS3, VS4, respectively by a switching circuit, and current detector IS2 is replaced with current detector IS1 by the switching circuit.

Referring to FIG. 9, control device 4 basically has the same configuration as control device 4 in FIG. 4, but control device 4 differs from control device 4 in FIG. 4 in that a phase difference control portion 20 and a harmonic-wave controller 21 are provided instead of pulse width control portion 12 and harmonic-wave controller 13. Control device 4 controls the operation of single-phase 3-level inverters INV-A, INV-B by performing the above four steps (1) to (4).

(1) Control of phase difference $\gamma$

Control device 4 controls phase difference $\gamma$ by a method similar to the control of phase difference $\gamma$ of the first embodiment.

(2) Setting of pulse width $\theta$

A harmonic-wave controller 21 sets pulse widths $\theta A$ and $\theta B$ such that the amplitudes of the nth harmonic components of AC voltages VA, VB becomes zero. For example, in order to reduce the tertiary harmonic component, harmonic-wave controller 21 sets phase widths $\theta A$, $\theta B$ such that amplitude Vn (n=3) of the tertiary harmonic component becomes zero. Specifically, harmonic-wave controller 21 sets each of pulse widths $\theta A$, $\theta B$ to $2\pi/3$ such that sin $(3\phi/2)=0$ is satisfied in the equation (5).

(3) Control of phase differences $\phi A$, $\phi B$

In the second embodiment, the phase differences $\phi A$ and $\phi B$ are controlled so that the effective value of the AC fundamental-wave voltage Va and the effective value of the AC fundamental-wave voltage Vb are equal. Specifically, phase difference $\phi$ of the AC voltage corresponding to the lower DC voltage of DC voltages EdA, EdB is fixed to $\pi$, and phase difference $\phi$ of the AC voltage corresponding to the higher DC voltage is narrowed, thereby the effective value of AC fundamental-wave voltage Va and the effective value of AC fundamental-wave voltage Vb are matched with each other.

For example, for EdA>EdB, by setting phase difference $\phi B$ to $\pi$ in the equations (9), (10), phase difference $\phi A$ for matching the effective value of Va with the effective value of Vb is given by the following equation (17).

$$\phi_A = 2\sin^{-1}\left(\frac{E_{dB}}{E_{dA}}\right) \quad (17)$$

Similarly, for EdA<EdB, by setting phase difference $\phi A$ to $\pi$ in the equations (9), (10), phase difference $\phi B$ for matching the effective value of Va with the effective value of Vb is given by the following equation (18).

$$\phi_B = 2\sin^{-1}\left(\frac{E_{dA}}{E_{dB}}\right) \quad (18)$$

Figure 10:
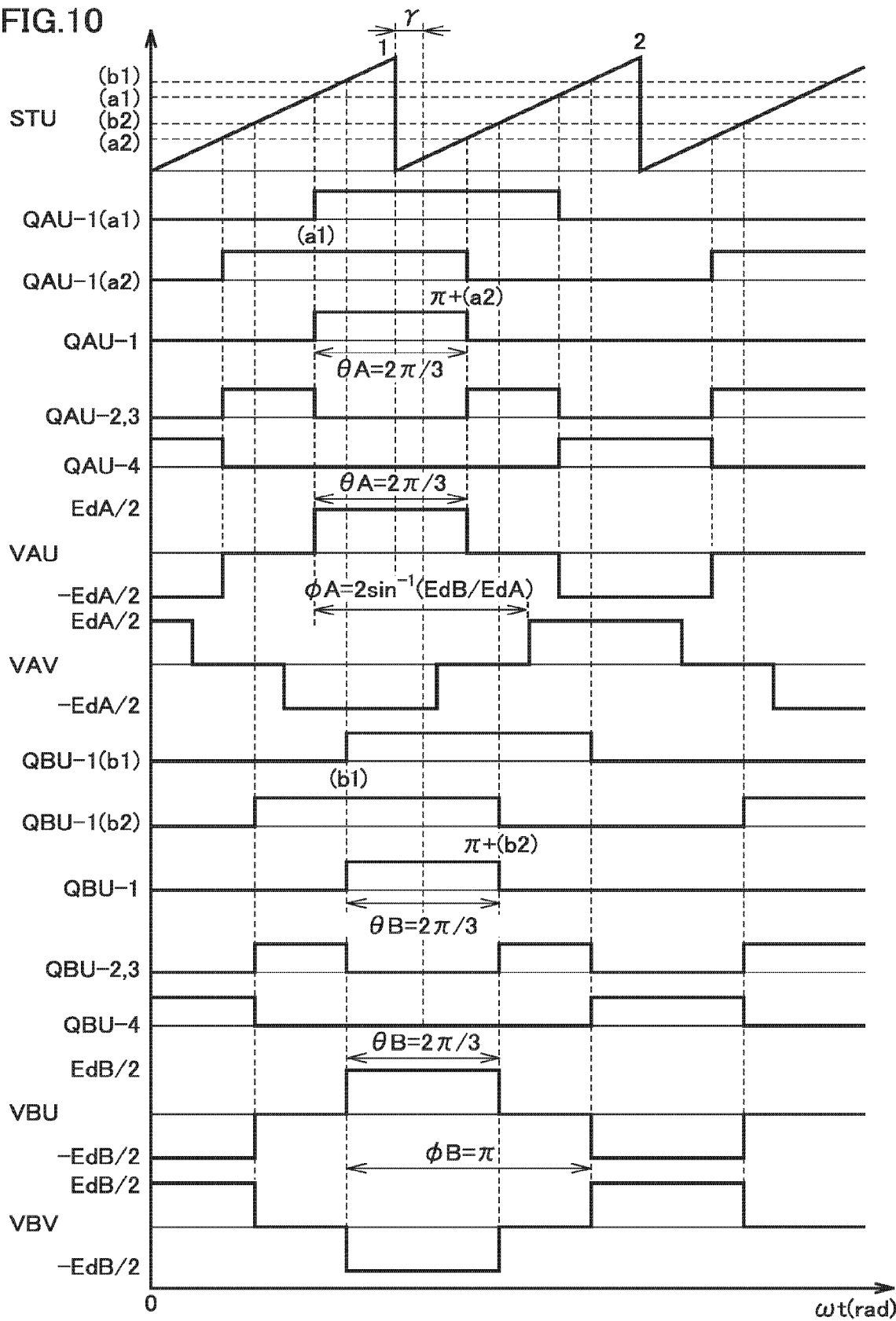
FIG. 10 is a timing chart illustrating a method for generating control signals of single-phase 3-level inverters INV-A, INV-B according to a second embodiment.

Referring to FIG. 10, adder 10 adds the voltage at both the ends of capacitor C1 detected by voltage detector VS1 and the voltage at both the ends of capacitor C2 detected by voltage detector VS2, and outputs DC voltage EdA between positive voltage terminal 1p and negative voltage terminal 1n.

Adder 11 adds the voltage at both the ends the capacitor C3 detected by voltage detector VS3 and the voltage at both the ends of capacitor C4 detected by voltage detector VS4, and outputs DC voltage EdB between positive voltage terminal 2p and negative voltage terminal 2n.

Phase difference controller 20 calculates phase difference φA from x=EdB/EdA and φA=2sin⁻¹(x). Phase difference controller 20 also calculates phase difference φB from y=Ed A/Ed B and φB=2sin⁻¹(y). However, a limiter is provided such that each of x and y becomes less than or equal to 1.

(4) Generation of control signal

Control signal generator 19 generates the control signals of single-phase 3-level inverters INV-A, INV-B based on pulse widths θA, θB set by harmonic-wave controller 21, phase difference γ generated by current controller 18, and phase differences φA, φB generated by pulse width controller 20.

A method for generating the control signal of each single-phase 3-level inverter will be described below with reference to FIG. 10.

FIG. 10 is a timing chart illustrating the method for generating the control signals of single-phase 3-level inverters INV-A, INV-B of the second embodiment. In FIG. 10, single-phase 3-level inverter INV-A is advanced and single-phase 3-level inverter INV-B is delayed. That is, the power is supplied from single-phase 3-level inverter INV-A to single-phase 3-level inverter INV-2.

In FIG. 10, it is assumed that DC voltage EdA is higher than DC voltage EdB (EdA>EdB). Thus, in the control of phase differences φA, φB, phase difference φB is fixed to π and phase difference φA is narrowed, thereby the effective value of AC fundamental-wave voltage Va and the effective value of AC fundamental-wave voltage Vb are matched with each other.

Control signal generator 19 generates sawtooth wave signal STU and generates four reference signals (a1), (a2), (b1), (b2) each of which is compared to sawtooth wave signal STU.

First reference signal (a1) is used to decide rise and fall of a first rectangular wave QAU-1 (a1) of IGBT element QAU-1 of single-phase 3-level inverter INV-A. First reference signal (a1) is given by the following equation (19).

$$(a1) = \frac{\pi}{2} + \left(-\frac{\gamma}{2} + \frac{\pi}{6}\right) + \left(-\frac{\pi}{2} + \frac{\phi_A}{2}\right) \quad (19)$$

First reference signal (a1) and sawtooth wave signal STU intersect each other in each cycle. When sawtooth wave signal ST intersects first reference signal (a1) in the odd-numbered cycle, first rectangular wave QAU-1 (a1) rises from the L level to the H level. When sawtooth wave signal STU intersects first reference signal (a1) in an even-numbered cycle, first rectangular wave QAU-1 (a1) falls from the H level to the L level.

Second reference signal (a2) is used to decide the rise and fall of a second rectangular wave QAU-1 (a2) of IGBT element QAU-1 of single-phase 3-level inverter INV-A. Second reference signal (a2) is given by the following equation (20).

$$(a2) = \frac{\pi}{2} + \left(-\frac{\gamma}{2} - \frac{\pi}{6}\right) + \left(-\frac{\pi}{2} + \frac{\phi_A}{2}\right) \quad (20)$$

Second reference signal (a2) and sawtooth wave signal STU intersect each other in each cycle. When sawtooth wave signal STU intersects second reference signal (a2) in the odd-numbered cycle, second rectangular wave QAU-1 (a2) rises from the L level to the H level. When sawtooth wave signal ST intersects second reference signal (a2) in the even-numbered cycle, second rectangular wave QAU-1 (a2) falls from the H level to the L level.

Control signal generator 19 calculates the logical product of first rectangular wave QAU-1 (a1) and second rectangular wave QAU-1 (a2) to generate the control signal of IGBT element QAU-1.

Control signal generator 19 also calculates the logical product of the inversion signal of first rectangular wave QAU-1 (a1) and second rectangular wave QAU-1 (a2), and calculates the logical product of first rectangular wave QAU-1 (a1) and the inversion signal of second rectangular wave QAU-1 (a2). Then, control signal generator 19 calculates the logical sum of the two logical products to generate the control signals of IGBT elements QAU-2, QAU-3.

Control signal generator 19 further calculates a logical product of the inversion signal of first rectangular wave QAU-1 (a1) and the inversion signal of second rectangular wave QAU-1 (a2) to generate the control signal of IGBT element QAU-4.

Although not illustrated, control signal generator 19 further generates the control signals of IGBT elements QAV-1 to QAV-4 by comparing sawtooth wave signal STV in which sawtooth wave signal STU is delayed by (φA−π) to first and second reference signals (a1), (a2).

In two reference signals (a1), (a2), π+(a2)−(a1)=θA is obtained. Consequently, as illustrated in FIG. 10, both the pulse widths of U-phase voltage VAU and V-phase voltage VAV become θA(=2π/3). Phase difference between U-phase voltage VAU and V-phase voltage VAV becomes φA by delaying sawtooth wave signal STV by φA−π with respect to sawtooth wave signal STU.

Third reference signal (b1) is used to decide the rise and fall of first rectangular wave QBU-1 (b1) of IGBT element QBU-1 of single-phase 3-level inverter INV-B. Third reference signal (b1) is given by the following equation (21).

$$(b1) = \frac{\pi}{2} + \left(\frac{\gamma}{2} + \frac{\pi}{6}\right) + \left(-\frac{\pi}{2} + \frac{\phi_B}{2}\right) \quad (21)$$

Third reference signal (b1) and sawtooth wave signal STU intersect each other in each cycle. When sawtooth wave signal ST intersects third reference signal (b1) in the odd-numbered cycle, first rectangular wave QBU-1 (b1) rises from the L level to the H level. When sawtooth wave signal STU intersects third reference signal (b1) in the even-numbered cycle, first rectangular wave QBU-1 (b1) falls from the H level to the L level.

Fourth reference signal (b2) is used to decide the rise and fall of second rectangular wave QBU-1 (b2) of IGBT element QBU-1 of single-phase 3-level inverter INV-B. Fourth reference signal (b2) is given by the following equation (22).

$$(b2) = \frac{\pi}{2} + \left(\frac{\gamma}{2} - \frac{\pi}{6}\right) + \left(-\frac{\pi}{2} + \frac{\phi_B}{2}\right) \quad (22)$$

Fourth reference signal (b2) and sawtooth wave signal STU intersect each other in each cycle. When sawtooth wave signal STU intersects fourth reference signal (b2) in the odd-numbered cycle, second rectangular wave QBU-1 (b2) rises from the L level to the H level. When sawtooth wave signal STU intersects fourth reference signal (b2) in the even-numbered cycle, second rectangular wave QBU-1 (b2) falls from the H level to the L level.

Control signal generator 19 generates the control signal of IGBT element QBU-1 by calculating the logical product of first rectangular wave QBU-1 (b1) and second rectangular wave QBU-1 (b2). Control signal generator 19 also calculates the logical product of the inversion signal of first rectangular wave QBU-1 (b1) and second rectangular wave QBU-1 (b2), and calculates the logical product of first rectangular wave QBU-1 (b1) and the inversion signal of second rectangular wave QBU-1 (b2). Then, control signal generator 19 calculates the logical sum of the two logical products to generate the control signals of IGBT elements QBU-2, QBU-3. Control signal generator 19 further calculates the logical product of the inversion signal of first rectangular wave QBU-1 (b1) and the inversion signal of second rectangular wave QBU-1 (b2) to generate the control signal of IGBT element QBU-4.

Figure 11:
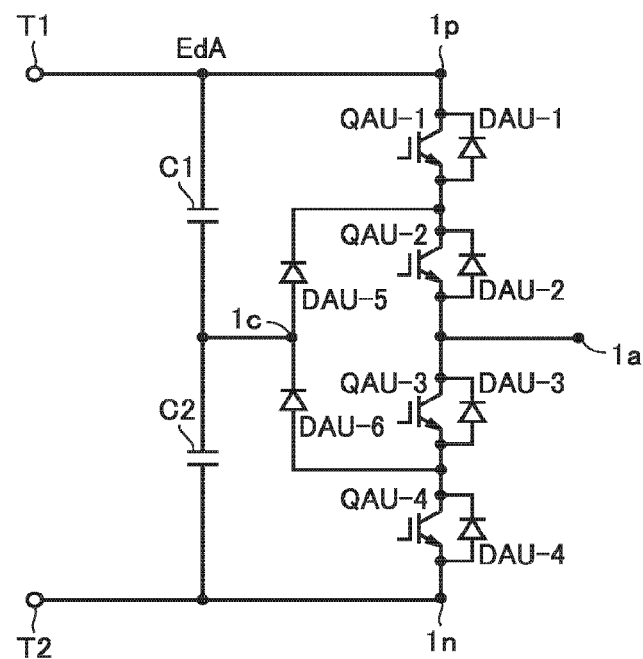
FIG. 11 is a diagram illustrating a modification of a 3-level circuit used for a single-phase 3-level inverter.

Although not illustrated, control signal generator 19 further generates control signals of IGBT elements QBV-1 to QBV-4 by comparing sawtooth wave signal STV to third and fourth reference signals (b1), (b2). In FIG. 11, because of phase difference ϕB=π, the phase difference between sawtooth wave signal STU and sawtooth wave signal STV becomes π−π=0 (in-phase).

Two reference signals (b1), (b2), π+(b2)−(b1)=θB. Consequently, as illustrated in FIG. 10, both the pulse widths of U-phase voltage VBU and V-phase voltage VBV become θB (=2π/3). Phase difference ϕB between U-phase voltage VBU and V-phase voltage VBV becomes ϕB=π by making sawtooth wave signal STU and sawtooth wave signal STV in-phase.

(Modification of Second Embodiment)

In the second embodiment, the effective values of the AC fundamental voltages Va, Vb are matched with each other by narrowing phase difference ϕ of the AC voltage corresponding to the higher DC voltage in DC voltages EdA, EdB. However, the present invention is not limited to the second embodiment, but phase difference ϕ of the AC voltage may be narrowed such that the difference between the effective values of the AC fundamental-wave voltages Va, Vb is less than or equal to a predetermined value. Alternatively, phase difference ϕ of the AC voltage may be narrowed such that the ratio of the difference between the effective values of the AC fundamental-wave voltages Va, Vb and the effective value of Va or Vb is less than or equal to several percent.

[Working Effect of Second Embodiment]

The working effect of the second embodiment will be described while the problem leading to the second embodiment is described.

Figure 13:
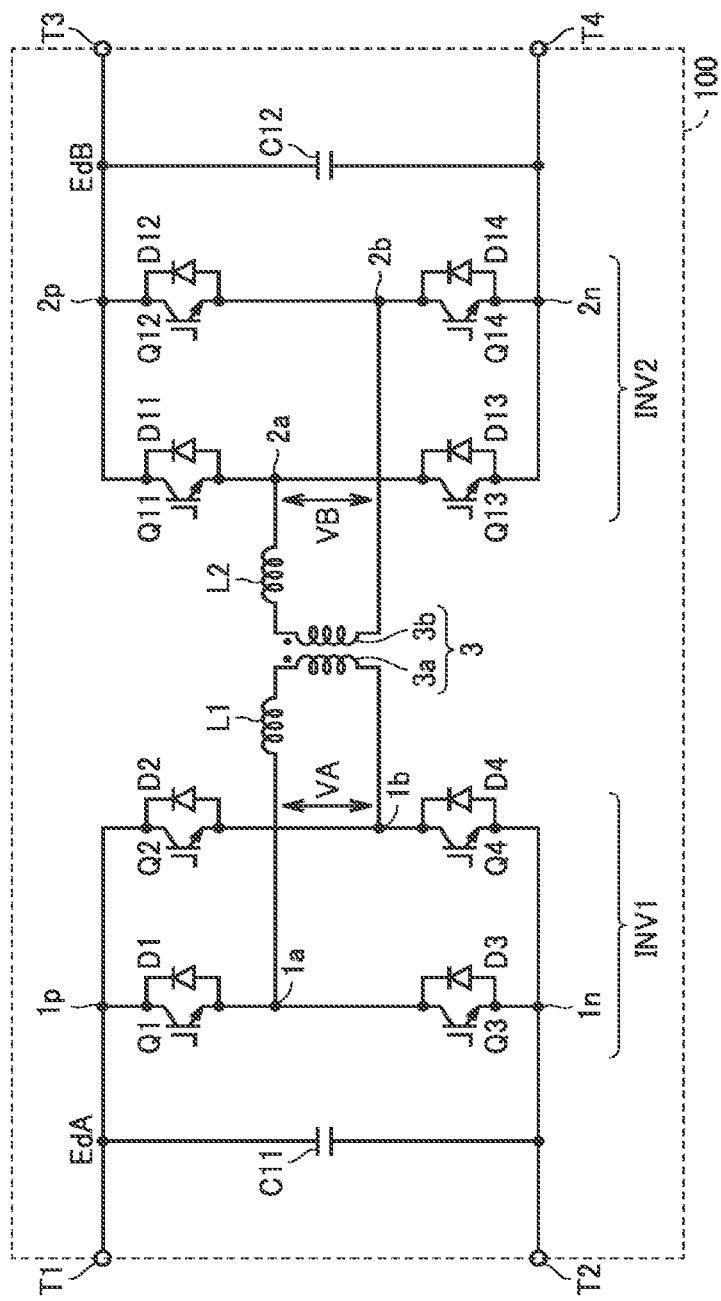
FIG. 13 is a circuit diagram illustrating a configuration of a bidirectional insulated DC/DC converter according to a comparative example.

FIG. 13 is a circuit diagram illustrating a configuration of a bidirectional insulated DC/DC converter according to a comparative example. Referring to FIG. 13, a bidirectional insulated DC/DC converter 100 of the comparative example basically has the configuration similar to that of bidirectional insulated DC/DC converter 1 in FIG. 2, but bidirectional insulated DC/DC converter 100 differs from bidirectional insulated DC/DC converter 1 in that each of two single-phase inverters INV1, INV2 is constructed with a 2-level circuit.

The inverter (2-level inverter) INV1 constructed with the 2-level circuit includes a U-phase arm and a V-phase arm. The U-phase arm includes IGBT elements Q1, Q3 connected in series between positive voltage terminal 1p and negative voltage terminal 1n and diodes D1, D3 connected in reversely parallel to IGBT elements Q1, Q3. AC terminal 1a is connected to the connection point of IGBT elements Q1, Q3. The V-phase arm includes IGBT elements Q2, Q4 connected in series between positive voltage terminal 1p and negative voltage terminal 1n and diodes D2, D4 connected in reversely parallel to IGBT elements Q2, Q4. AC terminal 1b is connected to the connection point of IGBT elements Q2, Q4.

Two-level inverter INV2 includes a U-phase arm and a V-phase arm. The U-phase arm includes IGBT elements Q11, Q13 connected in series between positive voltage terminal 2p and negative voltage terminal 2n and diodes D11, D13 connected in reversely parallel to IGBT elements Q11, Q13. AC terminal 2a is connected to the connection point of IGBT elements Q11, Q13. The V-phase arm includes IGBT elements Q12, Q14 connected in series between positive voltage terminal 2p and negative voltage terminal 2n and diodes D12, D14 connected in reversely parallel to IGBT elements Q12, Q14. AC terminal 2b is connected to the connection point of IGBT elements Q12, Q14.

Capacitor C11 is connected between terminals 1p, 1n of inverter INV 1, and smoothens and stabilizes DC voltage EdA between terminals 1p, 1n. Capacitor C12 is connected between terminals 2p, 2n of inverter INV2, and smoothens and stabilizes DC voltage EdB between terminals 2p, 2n.

2-level inverter INV1 is controlled by the output signal of a driver (not illustrated), converts DC voltage EdA between positive voltage terminal 1p and negative voltage terminal 1n into AC voltage VA, and outputs AC voltage VA between AC terminals 1a, 1b. 2-level inverter INV2 is controlled by the output signal of a driver (not illustrated), converts DC voltage EdB between positive voltage terminal 2p and negative voltage terminal 2n into AC voltage VB, and outputs AC voltage VB between AC terminals 2a, 2b.

At this point, in 2-level inverter INV1, AC voltage VA output between AC terminals 1a, 1b becomes a rectangular-wave AC voltage having a peak value EdA and pulse width θA. In inverter INV2, AC voltage VB output between AC terminals 2a, 2b becomes a rectangular-wave AC voltage having a peak value EdB and pulse width B. In the following, in order to comprehensively describe the voltage waveforms of 2-level inverters INV1, INV2, AC voltages VA, VB are comprehensively represented by an AC voltage V, and DC voltages EdA, EdB are comprehensively represented by a DC voltage Ed, and pulse widths θA, θB are comprehensively represented by pulse width θ.

The following equation (23) is obtained when the voltage waveform of the 2-level inverter is subjected to Fourier transformation expansion. It can be seen that many odd-order harmonic components are included in the equation (23). According to the equation (23), nth harmonic component vn is given by the following equation (24). It can be seen that magnitude of the nth order harmonic component is inversely proportional to a degree.

$$V = \frac{4}{\pi} E_d \sum_{n=1,3,5,\ldots}^{\infty} \frac{(-1)^{(n-1)/2}}{n} \sin\frac{n\theta}{2} \cdot \cos n\omega t \quad (23)$$

$$v_n = \frac{4}{n\pi} E_d \cdot \sin\frac{n\theta}{2} \cdot \cos n\omega t \quad (24)$$

The harmonic component given by the equation (24) is generated in bidirectional insulated DC/DC converter 100 of the comparative example, so that the harmonic components of the AC current flowing between two 2-level inverters INV1, INV2 increase. A power loss caused by the harmonic component leads to the degradation of conversion efficiency of bidirectional insulated DC/DC converter 100.

Figure 14:
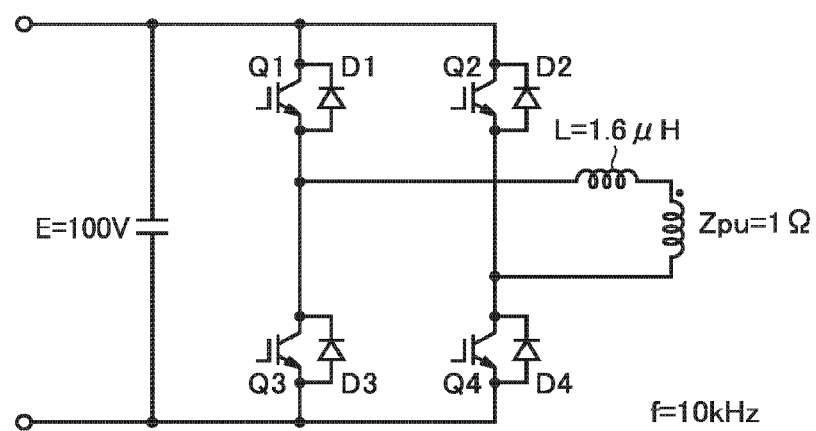
FIG. 14 is a diagram for considering a power loss generated in a 2-level inverter of the bidirectional insulated DC/DC converter according to the comparative example.

The power loss generated in a circuit in FIG. 14 will be considered below. In the circuit in FIG. 14, rated power of 2-level inverter is set to 100 kW, a switching frequency f is set to 10 kHz, and DC voltage Ed is set to 100 V. Thus, the rated current of 2-level inverter becomes 100 kW/100 V=100 A. Rated impedance Zpu becomes 100 V/100 A=1 Ω. Rated reactor Lpu becomes 15.9 μH from Lpu=1/(2πf).

Because the magnitude of a reactor L is considered to be about 10% to about 30% of rated reactor Lpu, preferably reactor L has about 1.59 μH to about 4.77 μH.

Hereinafter, reactor L is set to 1.6 μH (10%) for convenience.

In the voltage waveform of 2-level inverter, pulse width θ of the rectangular wave is set to θ=π. In this case, the effective values of the fundamental-wave component and the harmonic component of each of the AC voltage and the AC current are as follows. For the current, the magnitude of each degree component in which the magnitude of the fundamental-wave component is set to 100% is indicated together.

Fundamental-wave component:

$$V1=90 \text{ V}, I1=90 \text{ V}/(1+2\pi fL)^{1/2}=85.8 \text{ A}(100\%)$$

Third harmonic component:

$$V3=30 \text{ V}, I3=30 \text{ V}/(1+2\pi \cdot 3fL)^{1/2}=26.3 \text{ A}(30.7\%) \text{ 5th harmonic component:}$$

$$V5=18 \text{ V}, I5=50 \text{ V}/(1+2\pi \cdot 5fL)^{1/2}=2.9 \text{ A}(17.1\%)$$

Then, the fundamental-wave component and the ratio of the power loss of each degree component are calculated. The power loss is resistance×(current)². In the following, resistance is assumed to be constant, and the ratio of the power loss of each degree is calculated.

Only fundamental-wave component: 100%
Fundamental-wave component+tertiary harmonic wave component:

$$(100\%)^2+(30.6\%)^2=109.4\%$$

Fundamental-wave component+5th harmonic component:

$$(100\%)^2+(17.5\%)^2=103.1\%$$

Fundamental-wave component+tertiary harmonic component+5th harmonic component:

$$(100\%)^2+(30.6\%)^2+(17.5\%)^2=112.4\%$$

In the above calculation result, the ratio of the power loss of the third harmonic component to the fundamental-wave component is high about 10%. Thus, when the third harmonic component can be suppressed, it is estimated that the loss of about 10% can be reduced.

On the other hand, the ratio of the power loss of the fifth harmonic component to the fundamental-wave component is low about 3%. For this reason, when the fifth harmonic component is prevented, it is estimated that a loss reduction effect is low as compared with the case that the third harmonic component is suppressed. Consequently, the rate of the power loss decreases as the degree of the harmonic component increases, so that the loss reduction effect is considered to be low. In other words, it is considered that the power loss can be reduced most effectively by preventing the third harmonic component.

A configuration in which a series resonance circuit including a reactor and a capacitor is connected between 2-level inverter INV1 and primary winding 3a of insulated transformer 3 has been proposed as a countermeasure for preventing the harmonic component (for example, see NPL 2). However, in this configuration, the reactor of the series resonance circuit is enlarged, which results in an increase in size of the device. Additionally, large improvement of the conversion efficiency is hardly expected due to the power loss generated in the series resonance circuit.

On the other hand, in the second embodiment, the two inverters included in bidirectional insulated DC/DC converter 1 are constructed with the single-phase 3-level inverters, so that the output AC voltage of each inverter can be controlled using two variables of pulse widths θ of the U-phase voltage and the V-phase voltage and phase difference φ between the U-phase voltage and the V-phase voltage. Consequently, the amplitude of the nth harmonic component of the AC voltage can be set to zero using any one of pulse width θ and phase difference φ. That is, the nth harmonic component can be suppressed by controlling one of pulse width θ and phase difference φ. As described above, the third harmonic component is prevented in order to effectively reduce the loss. According to the second embodiment, pulse width θ or phase difference φ is set such that the amplitude of the third harmonic component becomes zero, so that the third harmonic component can easily be prevented.

In the second embodiment, the effective values of the AC fundamental wave voltages of the two inverters can be matched with each other by controlling the other of pulse width θ and phase difference φ. Thus, even if the difference between the DC voltages received by the inverters fluctuate largely, the power can stably be exchanged between the two inverters.

As described above, according to the second embodiment, the harmonic component can be suppressed by controlling the operation of the two single-phase 3-level inverters, so that installation of the series resonance circuit is eliminated. Thus, the enlargement of the device can be prevented. Additionally, the increase in power loss due to the series resonance circuit is prevented, so that the conversion efficiency can be improved.

[Modification of Second Embodiment]

(1) In single-phase 3-level inverters INV-A, INV-B, the 3-level circuit constituting the U-phase arm and the V-phase arm may have a configuration in FIG. 11. The 3-level circuit includes four IGBT elements and six diodes. FIG. 13 illustrates the 3-level circuit constituting the U-phase arm of single-phase 3-level inverter INV-A as a representative.

The IGBT elements QAU-1 to QAU-4 are connected in series between positive voltage terminal 1a and negative voltage terminal 1b. The diodes DAU-1 to DAU-4 are connected in reversely parallel to IGBT elements QAU-1 to QAU-4, respectively. The connection point of IGBT elements QAU-2, QAU-3 is connected to AC terminal 1a.

A diode DAU-5 is connected between the connection point of IGBT elements QAU-1, QAU-2 and neutral voltage terminal 1c. A diode DAU-6 is connected between the connection point of IGBT elements QAU-3, QAU-4 and neutral voltage terminal 1c. A cathode of diode DAU-5 is connected to the connection point of IGBT elements QAU-1, QAU-2, and an anode of diode DAU-5 is connected to neutral voltage terminal 1c. An anode of diode DAU-6 is connected to the connection point of IGBT elements QAU-3, QAU-4, and a cathode of diode DAU-6 is connected to neutral voltage terminal 1c.

Positive voltage terminal 1p and AC terminal 1a are connected to each other in a period during which IGBT elements QAU-1, QAU-2 are turned on while IGBT elements QAU-3, QAU-4 are turned off, so that output voltage VAU becomes +EdA/2.

Neutral voltage terminal 1c and AC terminal 1a are connected to each other in a period during which IGBT elements QAU-2, QAU-3 are turned on while IGBT elements QAU-1, QAU-4 are turned off, so that output voltage VAU becomes zero.

On the other hand, negative voltage terminal 1n and AC terminal 1a are connected to each other in a period during which IGBT elements QAU-3, QAU-4 are turned on while IGBT elements QAU-1, QAU-2 are turned off, so that output voltage VAU becomes −EdA/2.

That is, U-phase voltage VAU takes three values of ±EdA/2, 0. Similarly, the V phase voltage VAV also takes three values of ±EdA/2,0. Thus, AC voltage VA output between AC terminal 1a and AC terminal 1b of single-phase 3-level inverter INV-A takes five values of ±EdA, ±EdA/2, 0.

(2) In the second embodiment, DC voltage EdA between terminals T1, T2 is detected by voltage detectors VS1, VS2, and DC voltage EdB between terminals T3, T4 is detected by voltage detectors VS3, VS4. The present invention is not limited the second embodiment, but DC voltages EdA, EdB may be detected by another method. For example, output AC voltages VA, VB of single-phase 3-level inverters INV-A, INV-B are taken out into control device 4 through a signal transformer, the peak value of the taken-out AC voltage is sampled, and DC voltages EdA, EdB may be indirectly detected from the sampled peak value.

(3) In the second embodiment, two reactors L1, L2 are provided (see FIG. 1). Alternatively, one of two reactors L1, L2 may be eliminated. In the case that insulated transformer 3 has leakage inductance, two reactors L1, L2 may be eliminated.

[Third Embodiment]
(Configuration of Smart Network)

Figure 12:
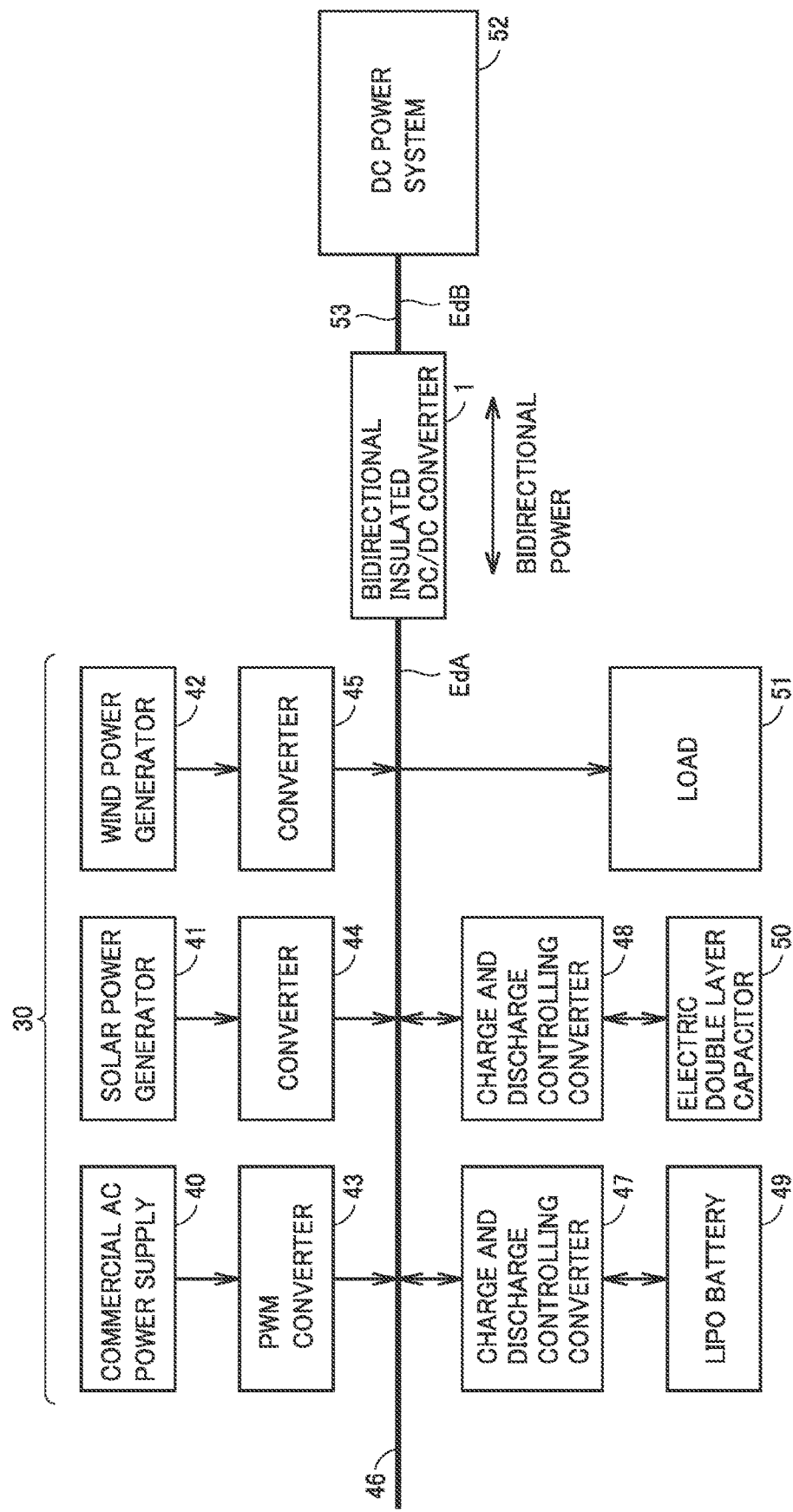
FIG. 12 is a block diagram illustrating a configuration of a smart network according to a third embodiment.

A configuration of a smart network according to a third embodiment using the bidirectional insulated DC/DC converter will be described with reference to FIG. 12.

The smart network of the third embodiment of the present invention includes bidirectional insulated DC/DC converter 1 and two DC power systems 30, 52.

DC power system 30 includes a commercial AC power supply 40, a solar power generator 41, a wind power generator 42, a PWM converter 43, converters 44, 45, a DC busbar 46, charge and discharge controlling transducers 47, 48, a LiPo battery 49, an electric double layer capacitor 50, and a load 51.

Commercial AC power supply 40 generates commercial AC power. PWM converter 43 converts the commercial AC power from commercial AC power supply 40 into the DC power of predetermined DC voltage EdA (for example, 300 V), and supplies the DC power to DC busbar 46. When the commercial AC power is insufficient, PWM converter 43 converts the DC power from DC busbar 46 into the AC power having a predetermined voltage at a commercial frequency, and supplies the AC power to commercial AC power supply 40.

Solar power generator 41 converts light energy from the sun into the DC power. Converter 44 converts the DC power generated by solar power generator 41 into the DC power of predetermined DC voltage EdA, and supplies the DC power to DC busbar 46. Wind power generator 42 converts wind power into the DC power. Converter 45 converts the DC power generated by wind power generator 42 into the DC power having predetermined DC voltage EdA, and supplies the DC power to DC busbar 46.

When the DC power is excessive in DC power system 30, charge and discharge controlling converter 47 takes out the DC power from DC busbar 46, and stores the DC power in LiPo battery 49. When the DC power is insufficient in DC power system 30, the DC power is taken out from LiPo battery 49, and supplied to DC busbar 46.

When the DC power is excessive in DC power system 30, charge and discharge controlling converter 48 takes out the DC power from DC busbar 46, and stores the DC power in electric double layer capacitor 50. When the DC power is insufficient in DC power system 30, the DC power is taken out from electric double layer capacitor 50, and is supplied to DC busbar 46.

Load 51 is a general residence, an office, a plant facility, or the like, and receives the supply of DC power from DC busbar 46. DC power system 52 has the configuration similar to that of DC power system 30, and includes DC busbar 53 maintained at predetermined DC voltage EdB (for example, 1000 V).

Bidirectional insulated DC/DC converter 1 is already described in the first and second embodiments, and exchanges the DC power between DC busbar 46 and DC busbar 53. DC busbar 46 includes a DC positive bus and a DC negative bus, which are connected to terminals T1, T2, respectively. DC busbar 53 includes a DC positive bus and a DC negative bus, which are connected to terminals T3, T4, respectively.

In bidirectional insulated DC/DC converter 1, phase difference φ between the U-phase voltage and the V-phase voltage of each single-phase 3-level inverter is set such that the amplitudes of the nth harmonic components of the output AC voltages in two single-phase 3-level inverters INV-A, INV-B become zero. Pulse widths θA, θB of the U-phase voltages and the V-phase voltages in single-phase 3-level inverters INV-A, INV-B are controlled according to the level difference of DC voltages EdA, EdB such that the effective values of the AC fundamental-wave voltages Va, Vb are matched with each other.

Alternatively, in bidirectional insulated DC/DC converter 1, pulse widths θ of the U phase voltage and the V phase voltage in each single-phase 3-level inverter is set such that the amplitudes of the nth harmonic components of the output AC voltages of two single-phase 3-level inverters INV-A, INV-B become zero, and phase differences φA, φB between the U-phase voltage and the V-phase voltage in single-phase 3-level inverters INV-A, INV-B are controlled according to the level difference of DC voltages EdA, EdB such that the effective values of AC basic wave voltages Va, Vb are matched with each other.

The bidirectional insulated DC/DC converter further sets phase difference γ between AC voltages VA, VB according to the value and the direction of the current to be passed. When the DC power is supplied from DC power system 30 to DC power system 52, the phase of AC voltage VA is advanced with respect to the phase of AC voltage VB. On the other hand, when the DC power is supplied from DC power system 52 to DC power system 30, the phase of AC voltage VB is advanced with respect to the phase of AC voltage VA.

For example, in the case that the commercial AC power supply breaks down in DC power system 30 to lack the DC power, the DC power is supplied from DC power system 52 to DC power system 30. Thus, the smart network also has a function of an uninterruptible power supply system.

In the third embodiment, even if DC voltages EdA, EdB of the DC power system fluctuate largely, the DC power can stably be exchanged between DC power systems 30, 52 by coupling the two DC power systems with bidirectional insulated DC/DC converter 1.

The above embodiments are only by way of example, and the present invention is not limited to the above embodiments. The scope of the present invention is indicated by the claims, and it is intended that all modifications within the meaning and scope of the claims are included in the present invention.

REFERENCE SIGNS LIST 1, 100: bidirectional Insulating DC/DC converter, 1a, 1b, 2a, 2b: AC terminal, 1p, 2p: positive voltage terminal, 1n, 2n: negative voltage terminal, 1c, 2c: neutral voltage terminal, 3: insulated transformer, 3a: primary winding, 3b: secondary winding, 4: control device, 5, 6: DC circuit, 10, 11: adder, 12: pulse width controller, 13, 21: harmonic-wave controller, 14: voltage command unit, 15, 17: subtractor, 16: voltage controller, 18: current controller, 19: control signal generator, 20: phase difference controller, 30, 52: DC power system, 40: commercial AC power supply, 41: solar power generator, 42: wind power generator, 43: PWM converter, 44, 45: converter, 46: DC busbar, 47, 48: charge and discharge controlling converter, 49: LiPo battery, 50: electric double layer capacitor, 51: load, INV-A, INV-B: single-phase 3-level inverter, INV1, INV2: 2-level inverter, DR1, DR2: driver, QAU-1 to QAU-4, QAV-1 to QAV-4, QBU-1 to QBU-4, QBV-1 to QBV-4, Q1 to Q4, Q11 to Q14: IGBT element, DAU-1 to DAU-4, DAV-1 to DAV-4, DBU-1 to DBU-4, DBV-1 to DBV-4, D1 to D4, D11 to D14: diode, T1, T3: positive voltage terminal, T2, T4: negative voltage terminal, IS1, IS2: current detector, VS1 to VS4: voltage detector, C1 to C4, C11, C12: capacitor, L1, L2: reactor

The invention claimed is:

1. A bidirectional insulated DC/DC converter that exchanges DC power between first and second DC circuits, the bidirectional insulated DC/DC converter comprising:
    a first single-phase 3-level inverter configured to generate a first AC voltage between a first output terminal and a second output terminal based on a first DC voltage received from the first DC circuit;
    a second single-phase 3-level inverter configured to generate a second AC voltage between a third output terminal and a fourth output terminal based on a second DC voltage received from the second DC circuit;
    an insulated transformer including a primary winding that receives the first AC voltage from the first and second output terminals and a secondary winding that receives the second AC voltage from the third and fourth output terminals; and
    a control device configured to control the first and second single-phase 3-level inverters, wherein
    the first single-phase 3-level inverter includes:
        a first circuit connected between the first DC circuit and the first output terminal to generate a first-phase voltage; and
        a second circuit connected between the first DC circuit and the second output terminal to generate a second-phase voltage,
    the first single-phase 3-level inverter is configured to generate a difference between the first-phase voltage and the second-phase voltage as the first AC voltage,
    the second single-phase 3-level inverter includes:
        a third circuit connected between the second DC circuit and the third output terminal to generate the first-phase voltage; and
        a fourth circuit connected between the second DC circuit and the fourth output terminal to generate the second-phase voltage,
    the second single-phase 3-level inverter is configured to generate a difference between the first-phase voltage and the second-phase voltage as the second AC voltage,
    the control device is configured to set any one of pulse widths of the first-phase voltage and the second-phase voltage and a phase difference between the first-phase voltage and the second-phase voltage such that an amplitude of an nth harmonic component (n is an odd number of 3 or more) included in each of the first and second AC voltages becomes zero.

2. The bidirectional insulated DC/DC converter according to claim 1, wherein
    the amplitude of the nth harmonic component is given by a following equation (1) when the pulse widths of the first-phase voltage and the second-phase voltage are equal to each other in each of the first and second single-phase 3-level inverters, $$Vn = 4E/n\pi \cdot \sin(n\theta/2) \cdot \sin(n\phi/2) \quad (1)$$

where Vn represents the amplitude of the nth harmonic component, E represents the first and second DC voltages, θ represents the pulse width, and φ represents the phase difference, and
    the control device is configured to set the phase difference between the first-phase voltage and the second-phase voltage such that $\sin(n\phi/2)=0$ is satisfied.

3. The bidirectional insulated DC/DC converter according to claim 2, wherein
    when the first DC voltage is higher than the second DC voltage, the control device is configured to narrow the pulse widths of the first-phase voltage and the second-phase voltage in the first single-phase 3-level inverter such that effective values of fundamental-wave components of the first and second AC voltages are matched with each other, and
    when the second DC voltage is higher than the first DC voltage, the control device is configured to narrow the pulse widths of the first-phase voltage and the second-phase voltage in the second single-phase 3-level inverter such that the effective values of the fundamental-wave components of the first and second AC voltages are matched with each other.

4. The bidirectional insulated DC/DC converter according to claim 1, wherein
    the amplitude of the nth harmonic component is given by a following equation (1) when the pulse widths of the first-phase voltage and the second-phase voltage are equal to each other in each of the first and second single-phase 3-level inverters, $$Vn = 4E/n\pi \cdot \sin(n\theta/2) \cdot \sin(n\phi/2) \quad (1)$$

where Vn represents the amplitude of the nth harmonic component, E represents the first and second DC voltages, θ represents the pulse width, and φ represents the phase difference, and
    the control device is configured to set the pulse widths of the first-phase voltage and the second-phase voltage such that $\sin(n\theta/2)=0$ is satisfied.

5. The bidirectional insulated DC/DC converter according to claim 4, wherein when the first DC voltage is higher than the second DC voltage, the control device is configured to narrow the phase difference between the first-phase voltage and the second-phase voltage in the first single-phase 3-level inverter such that effective values of fundamental-wave components of the first and second AC voltages are matched with each other, and when the second DC voltage is higher than the first DC voltage, the control device is configured to narrow the phase difference between the first-phase voltage and the second-phase voltage in the second single-phase 3-level inverter such that the effective values of the fundamental-wave components of the first and second AC voltages are matched with each other.

6. The bidirectional insulated DC/DC converter according to claim 1, wherein
the control device is further configured to set the phase difference between the first and second AC voltages such that a desired DC power is exchanged between the first and second DC circuits.

7. A smart network comprising:
the bidirectional insulated DC/DC converter according to claim 1; and
the first and second DC circuits, wherein
the first and second DC circuits are first and second DC power systems, respectively.

8. The smart network according to claim 7, wherein each of the first and second DC power systems includes:
a DC bulbar connected to the first or second single-phase 3-level inverter;
a DC power supply configured to supply a DC power to the DC busbar;
a load driven by the DC power from the DC busbar; and
a power storage device configured to store the DC power from the DC busbar.

9. The bidirectional insulated DC/DC converter according to claim 2, wherein
the control device is further configured to set the phase difference between the first and second AC voltages such that a desired DC power is exchanged between the first and second DC circuits.

10. The bidirectional insulated DC/DC converter according to claim 3, wherein
the control device is further configured to set the phase difference between the first and second AC voltages such that a desired DC power is exchanged between the first and second DC circuits.

11. The bidirectional insulated DC/DC convener according to claim 4, wherein
the control device is further configured to set the phase difference between the first and second AC voltages such that a desired DC power is exchanged between the first and second DC circuits.

12. The bidirectional insulated DC/DC converter according to claim 5, wherein
the control device is further configured to set the phase difference between the first and second AC voltages such that a desired DC power is exchanged between the first and second DC circuits.

* * * * *